(12) United States Patent
Hintz et al.

(10) Patent No.: US 11,480,470 B2
(45) Date of Patent: Oct. 25, 2022

(54) IMAGING SENSOR CALIBRATION

(71) Applicants: Kenneth James Hintz, Savannah, GA (US); Christopher James Hintz, Savannah, GA (US); David Grossman, Vienna, VA (US)

(72) Inventors: Kenneth James Hintz, Savannah, GA (US); Christopher James Hintz, Savannah, GA (US); David Grossman, Vienna, VA (US)

( * ) Notice: Subject to any disclaimer, the term of this patent is extended or adjusted under 35 U.S.C. 154(b) by 0 days.

(21) Appl. No.: 17/693,461

(22) Filed: Mar. 14, 2022

(65) Prior Publication Data

US 2022/0295044 A1 Sep. 15, 2022

Related U.S. Application Data

(60) Provisional application No. 63/160,990, filed on Mar. 15, 2021.

(51) Int. Cl.
*G01J 3/36* (2006.01)
*H04N 9/04* (2006.01)
*G01J 3/28* (2006.01)
*G02B 5/20* (2006.01)
*G01J 5/00* (2022.01)
*G01J 5/52* (2022.01)

(52) U.S. Cl.
CPC ............... *G01J 3/36* (2013.01); *G01J 3/2823* (2013.01); *H04N 9/04515* (2018.08); *G01J 5/52* (2013.01); *G01J 2005/0077* (2013.01); *G02B 5/205* (2013.01)

(58) Field of Classification Search
CPC ..... G01J 3/36; G01J 3/2823; G01J 5/52; G01J 2005/0077
See application file for complete search history.

(56) References Cited

U.S. PATENT DOCUMENTS

2021/0059123 A1* 3/2021 Lys ...................... H04N 5/2354

\* cited by examiner

*Primary Examiner* — David P Porta
*Assistant Examiner* — Mamadou Faye

(57) ABSTRACT

A calibration device receives at least a first multispectral measurement of: a first monochromatic signal taken at a first pixel location; a second multispectral measurement of a second monochromatic signal taken at a second pixel location; and a multiplicity of third multispectral measurements of a spatially distributed wide bandwidth dispersed spectrum, of a wide bandwidth signal, taken at a multiplicity of third pixel locations. The device relates known pixel values of wavelengths to pixel values of measured wavelengths. The device outputs spectrum wavelength and power calibration values for the multispectral imaging system, comprising at least a relation of: a first third pixel location to a first known wavelength; and a second third pixel location to a second known wavelength.

20 Claims, 19 Drawing Sheets

IMAGING SENSOR CALIBRATION

CROSS-REFERENCE TO RELATED APPLICATIONS

This application claims the benefit of U.S. Provisional Application No. 63,160,990, filed Mar. 15, 2021, entitled "Imaging Sensor Calibration," which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

DETAILED DESCRIPTION OF EMBODIMENTS

Figure 1:
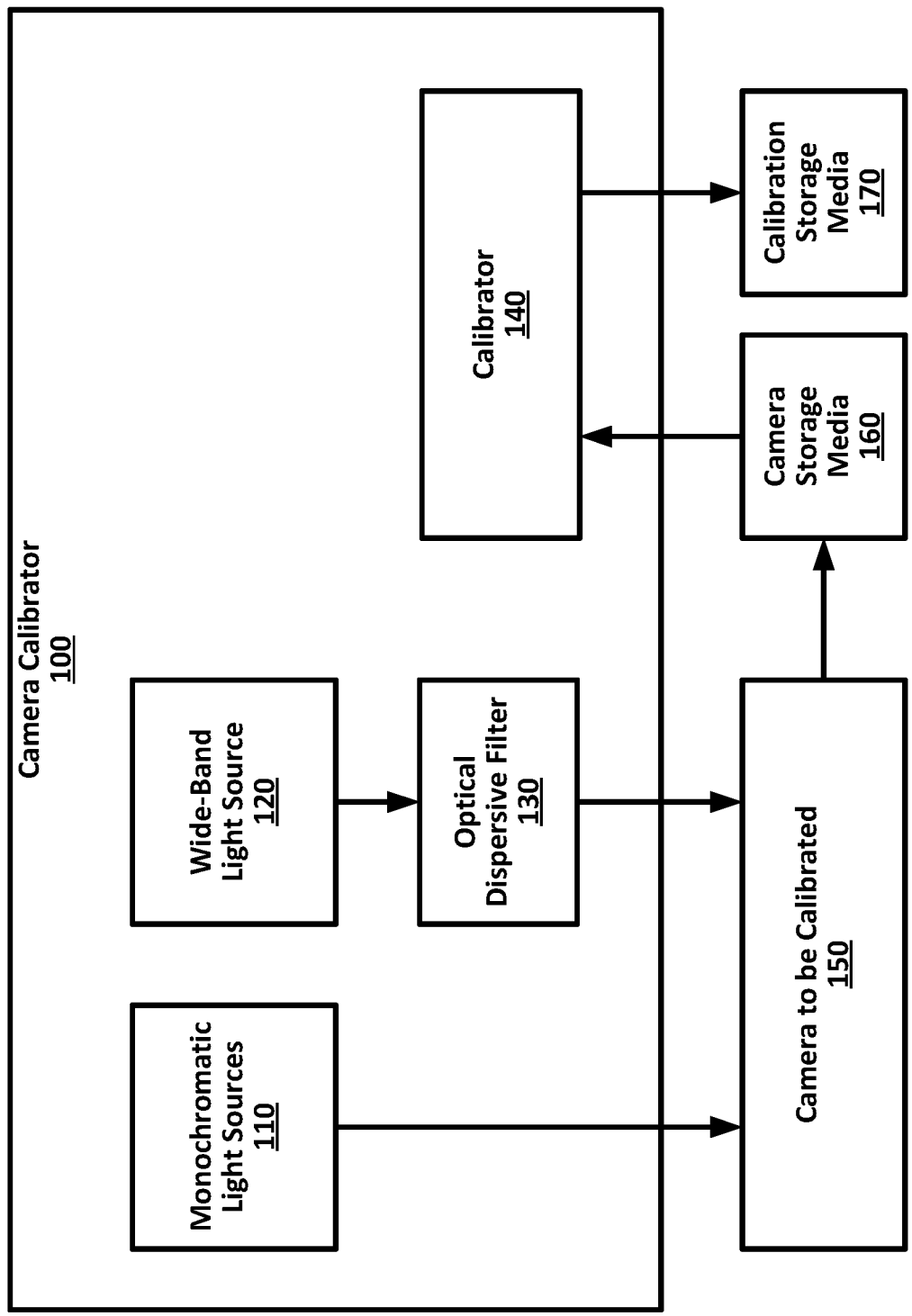
FIG. 1 is a block diagram of the camera calibrator components according to an aspect of an example embodiment of the present disclosure.

Example embodiments are generally directed to measuring the imaging properties of a multispectral imaging device to produce a spectral and amplitude correction table which can be applied to subsequent raw images captured by the multispectral imaging device in order to calibrate them. A multispectral imaging device can be a camera in an example embodiment. A multispectral imaging device may be an apparatus capable of measuring and storing amplitudes of incoming electromagnetic radiation at different wavelengths or different bands of wavelengths. Example embodiments of a calibration device may produce a calibration signal unique to a specific camera along with an integrated signal processor to produce and output calibration data for the calibration of subsequent images. Calibration is the process of configuring an instrument such as a consumer camera or other measurement device in order to provide a result for a sample taken with that device that is within an acceptable range.

An example embodiment includes a calibrated wide bandwidth light source diffracted by a diffraction grating or a refracting prism for radiating a spatially distributed light spectrum signal along with single wavelength light sources for radiating monochromatic light signals. A wide bandwidth light source is one which radiates electromagnetic radiation over an extended range of wavelengths such as the visual band, the infrared band, the ultraviolet band, or other band of non-ionizing radiation. A monochromatic signal may also be obtained by passing a wide bandwidth signal through a very narrow bandwidth filter. According to an embodiment, a monochromatic signal may comprise a single wavelength. According to an embodiment, a monochromatic signal may comprise more than a single wavelength. The wide bandwidth light source may be derived from the sun. The wide bandwidth light source may be derived from incandescent lamps. The wide bandwidth light source may be derived from arc lamps. The wide bandwidth light source may be derived from light emitting diodes (LED). These light signals are imaged directly by a multispectral imaging device to produce a calibration image. The calibration image may be used internally to the camera to calibrate subsequent images or stored on electronic media for post-processing. The multispectral imaging device may be a camera for which a calibration table is desired to produce calibrated images. For example, the camera may be consumer grade. The camera may be positioned so as to directly receive the wide bandwidth diffracted or refracted signal which is spatially distributed across multiple pixels. Each of the monochromatic light sources may be received on separate red, green, and blue (RGB) pixels. The receiving pixels may be in a conventional color mosaic format and be comprised of red, green1, green2, and blue (RGGB) or other mosaiced arrangement and referred to as mosaiced pixels. The camera may also be configured to produce maximum dynamic range images to maximize the signal-to-noise ratio (SNR) without saturating mosaiced raw red, raw green, and raw blue pixel (or RGGB) values which are to be stored.

An example embodiment may be implemented on a single transparent substrate onto which or into which, is created two or more narrow bandwidth optical filters configured to be of known wavelengths to use as monochromatic light sources. In addition to these narrow bandwidth transmission filters, a transmission grating or prism may be added to produce the spectrum. A source of wide bandwidth light which will pass though the example embodiment directly to a camera may be the sun or other celestial body with known spectral power characteristics at the input to the camera calibrator. Alternatively, the wide bandwidth source of light may be an artificial source provided that its spectral power characteristics are known.

Furthermore, an example embodiment may include a means to receive a raw image stored by the camera. The raw image is one which has not been compressed or in any other way altered within the camera in a manner which affects its fidelity to the measurement of the incoming light signal. Light can include any non-ionizing electromagnetic signal to which the camera imaging system is sensitive such as infrared or ultraviolet. The stored image of the monochromatic signals and spatially distributed spectrum are analyzed with a spectral and amplitude signal processor as a component of an example embodiment. The spectral signal processor associates pixels of the measured spatially distributed spectrum with their true physical wavelengths. The true physical wavelengths are known either by knowing the wavelength of the lasers used for calibration or the center wavelength of the narrow bandpass optical filters. An example embodiment may associate with pixels of the measured spatially distributed spectrum the unique red, green, and blue values the ratios of which define that spectral wavelength in the camera's measured pixels. The amplitude signal processor may also input known measurements of the wide bandwidth light signal from scientific sources and analyze the resulting camera color image of the spatially dispersed spectrum to produce a listing of correction factors. These correction factors may be applied on individual wavelengths in order to calibrate the amplitude of individual pixels of the image.

Spectral response at discrete single wavelengths is differentiated from the visual perception of color which includes both discrete wavelengths of light and combinations of discrete wavelengths which an observer identifies as a color. These mixed wavelength colors are called non-spectral colors or polychromatic colors. Single wavelength colors or monochromatic colors are of a single wavelength. An example of a monochromatic source of light is a laser or a scientific apparatus known as a monochromator. An embodiment may also output monochromatic light by passing a wide bandwidth light source through a narrow bandwidth filter. The difference between a laser and a monochromator is that a laser can produce only one wavelength of light and the monochromator can produce light at all frequencies in the spectrum and at a known intensity. That is, all spectral monochromatic wavelengths are colors, but not all colors as identified by a human or other biological observer are monochromatic.

In this document, a sensor is considered to be an imaging sensor comprised of multiple pixels independent of the wavelength of electromagnetic energy to which it is sensitive or able to measure. In the case of a camera which may be a digital camera, the photon count is measured as the voltage produced by an electronic sensor as a result of exposing it to the light over a duration of time. A photon accumulating sensor is a type of photon counter. A charge-coupled device is a photon accumulating sensors whose output value is proportional to the number of photons incident on it in a measured amount of time. An embodiment of a multispectral imaging system may also contain photovoltaic sensors or photoresistive sensors, each of which can output signals proportional to the incoming light intensity. That is, the observation must be corrected for observation time in order to measure instantaneous power rather than energy which is the integral or summation of power over time where power is the number of photons impinging on the sensor per unit time. It is envisioned that other types of sensors may be used.

In the following example discussion, we will use the sun as observed by a camera on a cloudless day at local apparent noon (LAN) at a known geographic position as measured by its latitude and longitude. We will use the term "standard sun" to mean this source of broadband light energy. The standard sun is used because its spectral output and power output are well known and measured by various earth observatories whose calibrated data are generally available. That is, we consider the standard sun as a spectral and amplitude calibrated source for performing our calibration. Other calibrated sources of broadband light with spectral bandwidths as wide as or wider than that measurable by the camera may be used.

Other calibrated sources of broadband light may include sun light, red, and/or blue and/or green light sources, tristimulus color light sources, artificial light, light emitting diode (LED) light, florescent light, and/or incandescent light after they are calibrated.

When the standard sun is observed by a camera through a transmission diffraction grating or refractive prism, the spatially distributed solar spectrum of the standard sun may be observed and measured. The measurement of the spectrum may be stored as an electronic image on a storage medium. Alternatively the sun's energy could be projected onto a surface utilizing a reflective diffraction grating producing the same spatially distributed sun spectrum, however the amplitude of the different wavelengths will be affected by the reflective characteristics of the surface onto which the spectrum is reflected. The need for this correction to the spectrum can be avoided by directly imaging the diffracted sun's spectrum through a transmission grating. In order to preserve the calibrated amplitude of the diffracted spectrum, the imaging system must be adjusted to produce a non-saturating image. By non-saturating image is meant that no pixel containing the R, G, or B values or mosaiced values of a spectral wavelength exceeds the dynamic range of the analog to digital converter which converts the insolation to a digitally stored measurement of the voltage of the sensor where the voltage is proportional to the number of incident photons over some unit of exposure time. Insolation is the radiation of an object by the sun. In order to maintain the greatest resolution in the measurement, the largest, non-saturating setting of the camera may be used in order to maximize the dynamic range between the largest and smallest amplitude signal. Maximizing the dynamic range will maximize the signal to noise ratio (SNR).

The transmission diffraction grating projects onto the camera's imaging sensor the spectrum of light distributed across a line of pixels such that individual wavelengths of the spectrum can be associated with individual pixels. Since a digital camera typically measures color by measuring the amplitude of light passing through each of three or more colored filters, red, green (their typically are two separate green filtered pixels), and blue (RGB), where the spectral response of each of these analog filters is known and the RGB value of each spectral wavelength is known. If one assumes the spectrum to which the camera is sensitive spans the range of 400-700 nanometers (nm) and the spectrum is spatially distributed over 1000 pixels, then each pixel would represent the energy measured over a 300 nm/1000 bandwidth or 0.3 nm. Other spectrum spreads across a different number of pixels could produce a different number of wavelengths per pixel. Each pixel essentially represents all the energy in a narrow band of wavelengths defined by the difference in wavelengths of adjacent pixels. This energy is considered to be located around the wavelength assigned to the pixel.

What is unknown at this point is the exact physical wavelength to assign to each of these pixels. In an embodiment of this camera calibrator, this uncertainty can be resolved by taking non-saturated images of typically three monochromatic lasers of distinctly different wavelengths either in the same or a separate image although two would be sufficient. If these lasers are directed at the camera rather than taking images of the lasers projected on a surface, then the correction due to the non-uniform spectral response of the reflecting surface can be avoided. Typical laser wavelength values are red at 650 nm, green at 532 nm, and blue at 405nm. Each of these lasers produces RGB (or RGGB) values in the imaging sensor unique to their spectral color. The ratio of these values is unique to a spectral wavelength independent of the total power which is the sum of the R, G, and B (or RGGB) amplitudes of the pixel at that wavelength. A pixel-to-physical-wavelength mapping can now be made in which the spectrum pixel whose RGB value is the least distant in a metric space to a laser value is assigned that wavelength. This assignment also carries with it the unique values of red, green, and blue which define that wavelength in RGB space. Pixels between those laser wavelengths can be assigned wavelengths through linear or other interpolation between those values as well as extended to pixels outside those laser wavelength values. Note that RGB values can be derived from demosaiced raw images taken with RGGB or other mosaic of individual color sensors. When the term RGB is used here, it generally means the demosaiced values which are derived from the mosaiced values before they are calibrated for white balance.

It has also been observed with measured RGB data that each spectral pixel may be uniquely associated with only two values in either RG, RB, or GB planes. This embedding of spectrum colors in orthogonal planes of the RGB system allows for non-spectral, polychromatic colors to be decomposed into combinations of only two wavelengths independent of the number of monochromatic wavelengths which may have produced the polychromatic RGB value.

A relation can be defined by a linear, nonlinear, piecewise linear, or other mathematical functional relation. A relation may also be a listing of paired values, for example a set of vectors. A vector is an ordered set of values. A vector of paired values may represent a wavelength and a location of a pixel that contains the values such as at least red, green, and blue values which represent that wavelength. For example, a relation may be expressed as (530nanometers, [row 30, column 10]). A relation may also define an association between a wavelength and a vector of at least red, green, and blue values or a vector of mosaiced values. For example, an association may be expressed as (530 nanometers, [200, 400, 670]). These vector values may be comprised of real, counting, or integer values.

Now that the spectral response of the imaging sensor is known in that individual spectral wavelengths of known wavelengths are associated with unique RGB values, the amplitude response of the camera can be characterized. The spectral power of the standard sun is measured regularly by scientific establishments, and is generally available. A typical spectral amplitude response of the sun has been presented by Bird83 (Bird, R. E., and Hulstrom, R. L., "Terrestrial Solar Spectral Data Sets", Solar Energy, Vol. 30, no. , pp. 563-573, 1983) and Bird86 (Bird, R. E., and Riordan, C., "Simple Solar Spectral Model for Direct and Diffuse Irradiance on Horizontal and Tilted Planes at the Earth's Surface for Cloudless Atmospheres", Journal of Climate and Applied Meteorology, vol. 25, no. 1, pp. 87-97, Jan. 1, 1986) and daily calibrated observations are taken by the National Renewable Energy Laboratory (NREL) and readily available at the National Solar Radiation Database (NSRDB). As a consequence of these measurements, the solar irradiance is known and the atmospheric absorption is also known meaning that the standard sun may be used to calibrate the amplitude response of a camera. Utilizing again the non-saturated image of the spatially spread spectrum of the sun, the known power of the sun may be compared to the observed power at each spectral line over the bandwidth captured by individual pixels. The power observed by the camera is distributed across the R, G, and B images with the sum of these individual color amplitudes at each spectral pixel being the power observed at that wavelength. From the known solar spectral power at each wavelength and the measured sum of the RGB images at each wavelength, an amplitude correction factor may be computed. This correction factor may be applied to arbitrary images in order to calibrate them.

The calibration of an arbitrary color image may be performed by decomposing each polychromatic pixel into two unique spectral monochromatic wavelengths of different amplitude values. The wavelengths into which the polychromatic pixel may be decomposed will be called basis wavelengths. Since each of these basis wavelengths has a known amplitude correction value, these correction values may be applied to the individual RGB values of the polychromatic pixel proportional to the amount of each basis wavelength into which the polychromatic color is decomposed. This decomposition uniquely determines the two basis wavelengths.

The result may be that an arbitrary image taken by a camera, which has also been used to take a calibration image of the output of the camera calibration apparatus, may be processed to produce a spectral and amplitude calibrated image which can be combined with images taken by other similarly calibrated camera to produce comparable scientific data. The result of applying this camera calibration procedure across a multiplicity of cameras is that their data can be compared, contrasted, combined, and analyzed with scientific precision and accuracy.

An example embodiment may include lasers of known wavelengths as monochromatic sources combined with a direct or reflected image of the sun whose spectral amplitude characteristics are known. An example embodiment may include narrow bandwidth filters whose output signals are essentially monochromatic. These narrow bandwidth filters may be used in place of the lasers for calibration. An example embodiment may receive from a calibrated source a wide bandwidth signal which can be filtered to produce narrow bandwidth signals on known central wavelengths. The same calibrated wide bandwidth signal may also be applied to a dispersive filter to produce a spectrum of the wide bandwidth signal. An example embodiment may use a transmission grating as a dispersive filter. An example embodiment may use a reflective grating as a dispersive filter. An example embodiment may use a prism as a dispersive filter.

Consumer cameras are well known to take images of visual scenes with sufficient accuracy and resolution to satisfy consumer requirements. However, they are not sufficiently accurate to be used for scientific or comparative measurements from consumer camera to consumer camera. There is a need for a reduced cost imaging system calibrator such that consumer cameras may be sufficiently calibrated in order to be useful for accurate scientific measurements. A low cost consumer camera calibration apparatus may enable the distribution of scientific measurements across a large group of non-science specialists enabling citizen science to be performed in which accurate visible light measurements are required. The generic term "camera" may be used in the following to refer to either or both consumer cameras and scientific imaging systems as well as multispectral imaging systems.

An example of this citizen science is the mapping of light pollution impinging on the nesting beaches of marine turtles. Light pollution may affect other animals. This light pollution may cause the newly hatched turtles emerging from the nests to migrate towards the land rather than towards the ocean ultimately leading to their death and a reduction of the number of turtles that make up the already endangered sea turtle population.

Since it is well known that the visual spectral response of turtles is not the same as humans, it is necessary to take accurate measurements of the light pollution where accuracy means both the wavelengths of the light, i.e., the spectral response, and the amplitude of that light, i.e., the light's intensity or power. With accurate spectral and amplitude calibration data for a camera, the light as measured by a camera and stored as an image can be processed to determine the true physical spectrum and amount of light that it captures in an image. These calibrated data may be modified by the known response of a turtle's visual system to determine the spectral amplitude as would be seen by a turtle. Knowing what the turtle would observe and combining it with other known scientific data as to the probability of a turtle navigating towards certain wavelengths and amplitude of lights, leads to methods for decreasing marine turtle hatchling mortality. The entire area of a nesting beach may be measured to produce a turtle hatchling light pollution map with areas of unacceptable light pollution identified. Alternatively, as sea turtle (marine turtle) nests are discovered, measurements local to that area may be made utilizing scientific, calibrated equipment.

It is important to note that the response of turtle vision is generally measured using a monochromator which produces data that is the relative sensitivity of the turtles' eyes to individual spectral lines, not all arbitrary or polychromatic colors. Since much light pollution consists of non-spectral, polychromatic signals, it is necessary to be able to decompose the polychromatic signals into their constituent wavelengths of light which are referred to here as basis wavelengths. In order to produce a polychromatic light as it would be seen by a turtle, it is necessary to adjust the calibrated values of the basis wavelengths of the spectral colors, but also to correct them by the known relative sensitivity of a turtle's vision. These calibrated and corrected spectral values may be recombined in a proportion to produce a polychromatic light amplitude as it would be sensed by a turtle.

Sea turtle nesting in Georgia increased nearly 300% from 2009-2019. However, sea turtle nesting success rates, defined as the number of nests out of total nesting attempts, did not match the state-wide increases in nesting numbers. Hatchlings find the sea using optical cues moving toward the brightest area and away from the highest elevation (e.g., dunes). Artificial light can disrupt these natural cues, thereby decreasing the sea finding success rates of hatchlings. A growing concern along Georgia's beaches is from non-point-source inland community lights illuminating the night sky or reflecting off clouds creating shoreward sky glow. Sky glow increases shoreward beachfront illumination by factors of 3-10 and can be created by communities 30 km inland. Many of Georgia's developed barrier islands are affected by both local beachfront lighting and sky glow from inland populated areas. However, uninhabited islands can also be affected by inland cities that radiate sky glow on otherwise dark nesting beaches A critical factor to consider while studying anthropogenic lighting impacts on sea turtles is the perception of sea turtle vision. Sea turtle eyes are most sensitive in the blue-green spectrum (520-540 nm). Impacts of inland sky glow on sea turtle nesting activity are not well understood. Sky glow can potentially modify the original direct inland illumination to create more Sea Turtle Relevant Light (STRL) in the shoreward nighttime sky. Shorter blue wavelengths become 7 times more radiant on cloudy nights. This is considerably important to Georgia daily summertime air-mass thunderstorms forming scattered cumulonimbus clouds dissipating after sunset and moving across the beaches offshore. Other studies observed higher green wavelength sky glow intensity from nearby inland communities during relatively dark quarter and new moon. Qualitatively similar research has been conducted to illustrate different color enhancements of sky glow with night-time images.

Since it is not practical to equip a staff of trained scientists with calibrated light measuring equipment to measure all of the turtle nesting sites, citizen scientists can be recruited to acquire data at various turtle nesting sites if their consumer cameras can produce calibrated measurements. Consumer cameras require calibration in order to combine data from the observations of multiple citizen science observers with different consumer cameras. If it is assumed that an individual camera is statistically stationary and doesn't significantly change its imaging characteristics over its useful lifetime or between calibrations, then a set of images can be taken with the aid of a camera calibration device and these calibration images can be utilized to produce camera specific calibration data. This camera specific calibration data can then be applied to subsequent images in order to calibrate those images and make them comparable with images taken with other camera which have been calibrated in a similar manner.

Additional difficulties associated with the calibration of instruments to scientific accuracy standards are the cost associated with existing calibration standards such as a monochromator or calibrated light source. It is desirable to replace expensive calibration standards with highly portable, accurate, and inexpensive alternatives such as lasers and the sun itself so that inexpensive and ubiquitous consumer cameras such as smart telephones with cameras or consumer grade cameras can be calibrated and made useful for the acquisition of scientific data.

In order to completely calibrate a camera, two different aspects of light must be characterized. The first is its spectral response. Spectral response here not only means the bandwidth to which the camera is sensitive, but also the assignment of specific wavelengths to measured RGB values. The second is its amplitude response at each of the wavelengths of the spectra to which its imaging system is sensitive. Spectral response here is meant to be those discrete, monochromatic wavelengths of light to which the camera's imaging system is sensitive. The wavelength of light may be measured in nanometers where a nanometer is $1\times10^{-9}$ meters in SI units. Amplitude response here is meant to be the amount of power as measured by, for example, the quantity of incident photons at individual wavelengths.

Existing imaging system calibration systems generally use light reflected from a surface for determining the response of an imaging system to specific wavelengths of light of specific amplitudes. The use of reflecting surfaces requires an additional step and expense in the calibration process in that the reflecting surfaces must be very well characterized in both spectral and amplitude response, hence expensive.

Existing imaging sensors and their associated color bandpass filters are well known to not be linear across the entire bandpass(es) of the filters. Not even when the typical red, green, and blue filter outputs are combined do they produce a uniform amplitude response across the spectrum. Furthermore, most consumer cameras output compressed images which non-linearly distort the image. While an approach to attempt to mitigate this issue is to use only devices that produce raw images, even the raw red, green, blue (RGB) or mosaiced RGGB output does not produce a linear response to all wavelengths in the spectrum. While manufacturers may provide a correction factor which can be applied to images, this does not account for camera-to-camera variations which would prevent the effective scientific combining of images from different cameras.

Since it is desired to take images in remote locations by untrained and possibly unsupported people, it would be difficult to bring equipment to them to calibrate their consumer electronics. There also may be no local source of electrical power with which to power the equipment. The camera calibrator disclosed here needs only to take an image of the sun through the camera calibrator and store it to a media for further processing to determine the calibration parameters for subsequent images.

A cost effective and readily available alternative to the use of expensive calibrated light sources is to utilize readily available and inexpensive light sources. The first of these readily available narrowband light sources is monochromatic lasers. The second wide bandwidth light source is the sun. Alternatively narrow bandwidth filtered wide bandwidth light can be used to produce light of sufficiently narrow bandwidth to be considered monochromatic.

The second component of a cost effective system is the elimination of the need for calibrated and expensive reflective surfaces by removing the reflective surface from the process. Monochromatic lasers may be pointed directly at the imaging system with sufficient attenuation provided either by stopping down the camera itself or by interposing a light attenuating neutral density filter. The attenuation of the direct, low-power laser signal may prevent the saturation of the digital light detector which counts incident photons thereby enabling accurate measurement of, for example, the ratio of red, green, and blue signals which characterize that wavelength of light. In photography and optics, a neutral-density filter, or ND filter, is a filter that reduces or modifies the intensity of wavelengths, or colors, of light equally, giving no changes in hue of color rendition. It can be a colorless (clear) or grey filter, and is denoted by Wratten number 96. A neutral density filter can be implemented, for example, by a series of cross-polarized filters rotated at angles to each other. The attenuation of the filter may be adjusted by the relative angle between them.

The spectral amplitude of the response may also be measured without an intermediate reflective surface. The spectral amplitude response is the relative sensitivity of the imaging system at each of the wavelengths to which it is sensitive. The light from the sun itself, which is well characterized in the mean by spectral wavelength as well as in specific geographic locations after transmission through the earth's atmosphere, may be used as a source of wide bandwidth light of known spectral amplitude. The sun's light, for example, at local apparent noon (LAN) when it is highest in the sky and on a clear day with minimal atmospheric disturbance and attenuation, may be diffracted through a transparent diffraction grating or other spatially dispersive filter. The diffraction of the sun produces the entire spectrum of colors to which the imaging system may be sensitive while spatially distributing them in angle. This spatial distribution of spectral colors may be imaged as a line of colors distributed across many pixels in the camera's image. Again, the sun's spatially distributed spectrum may need to be attenuated before it is imaged to prevent saturation and maximize SNR by a neutral density filter (NDF), but NDF are inexpensive.

The elimination of expensive calibrated reflectors and replacement of a monochromator to produce the entire spectrum of light signals with directly imaged lasers and directly imaged diffracted sun image as disclosed here provides an inexpensive alternative to normal spectral and amplitude calibration devices and methods.

The camera calibrator disclosed here needs only to take an image of the sun through the camera and the camera calibrator device and store it to a media for further processing to determine the calibration parameters for subsequent images taken with camera.

The camera calibrator may be readily portable. The camera calibrator does not require any external power source with which to take the calibration image. The camera calibrator is inexpensive relative to the calibration equipment normally required to calibrate an imaging sensor to scientifically useful accuracy.

FIG. 1 illustrates a camera calibrator 100 which contains the monochromatic light sources 110, the wide-band light source 120, the optical dispersive filter 130 and the calibrator 140. The camera to be calibrated 150 may be external to the camera calibrator 100 as may be the camera storage media 160 and calibration storage media 170.

Figure 2:
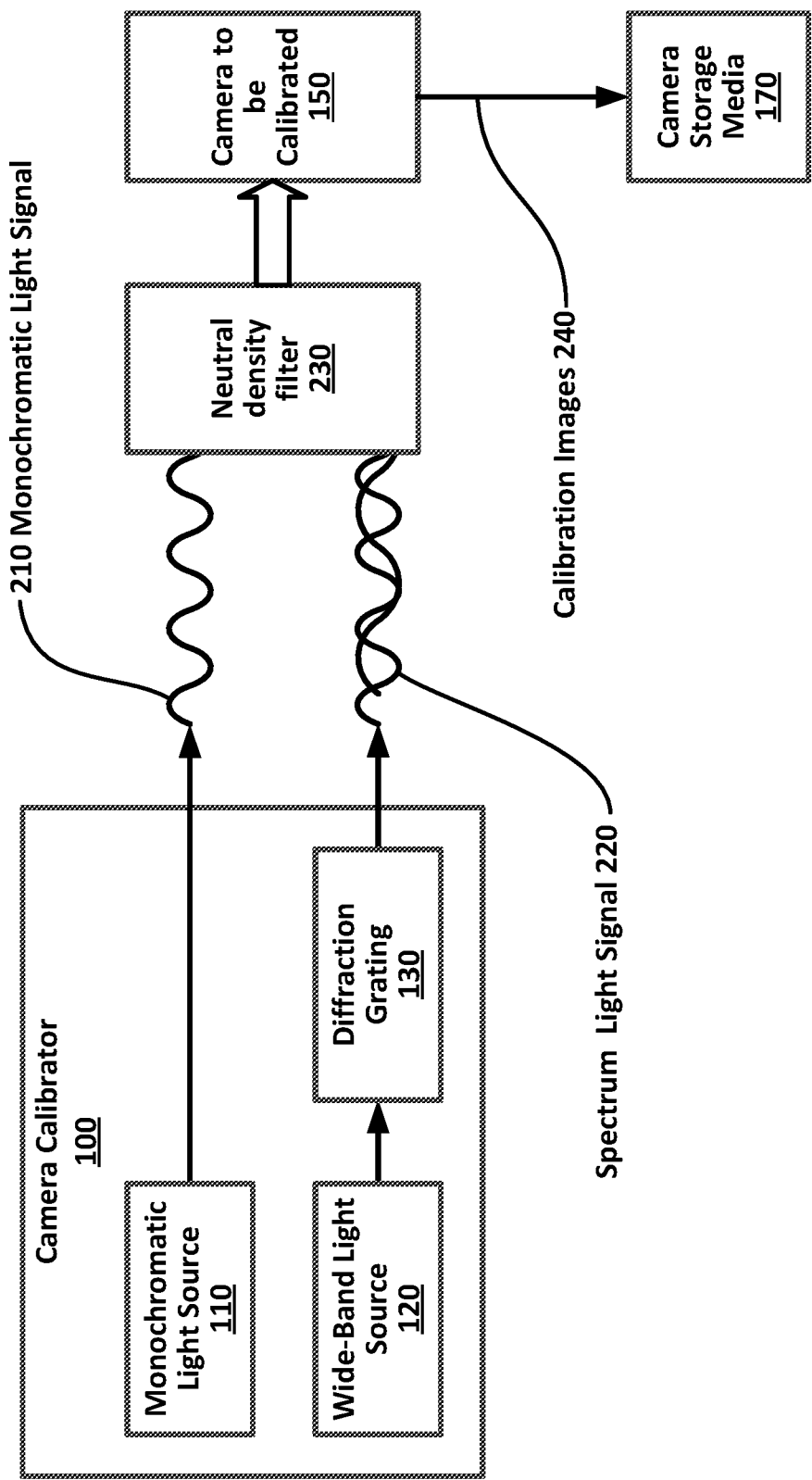
FIG. 2 illustrates the radiation of monochromatic and diffracted signals to the camera to be calibrated according to an aspect of an example embodiment of the present disclosure.

FIG. 2 shows the monochromatic light signal 210 and the spectrum light signal 220 radiating from the camera calibrator 100. The light signals may travel through a neutral density filter 230 or other optical filter with known optical and spectral attenuation characteristics. The camera to be calibrated 150 acquires images of the incoming light 210 and 220 and outputs calibration images 240 which are stored on camera storage media 170.

Figure 3:
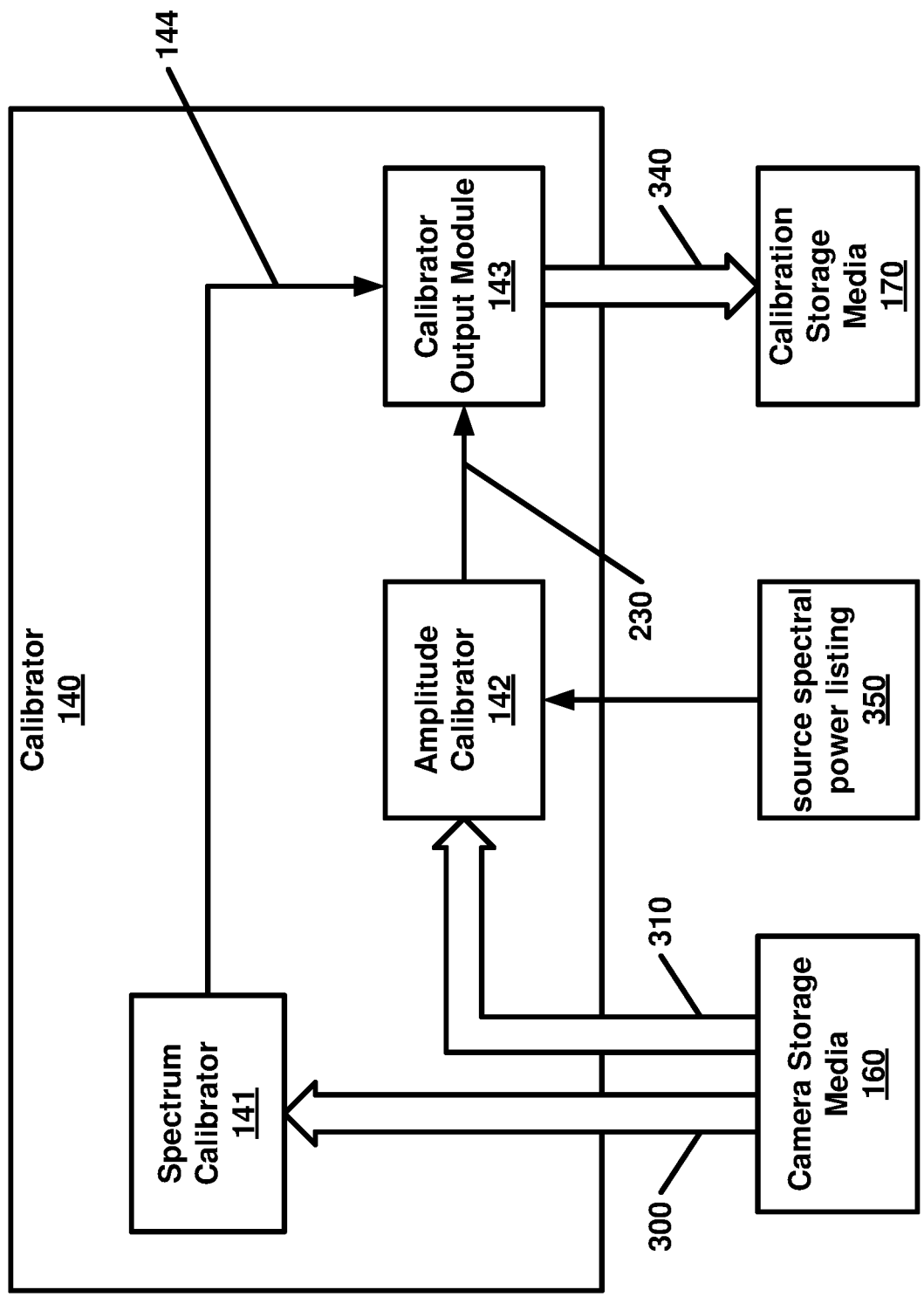
FIG. 3 is a flowchart of the calibrator functions according to an aspect of an example embodiment of the present disclosure.

FIG. 3 shows the components of the calibrator 140 which includes a spectrum calibrator 141, an amplitude calibrator 142, and a calibrator output module 143. The input to the spectrum calibrator 141 is the camera's stored calibration images 300 which include the RGB or mosaiced valued pixelated images of the monochromatic signals and RGB valued or valued mosaiced pixelated images of the wide-band spectrum. The spectrum calibrator 141 may relate the known wavelengths of the monochromatic signals with identified pixels in stored calibration image 300 of the wide-band spectrum. The spectrum calibrator output 144 of the spectrum calibrator 141 may be routed to the calibrator output module 143 to be combined with other calibration data in preparation for outputting the combined calibration data 340 to a calibration storage media 170.

FIG. 3 also shows the amplitude calibrator 142 portion of the calibrator 140. The input to the amplitude calibrator 142 may be the camera's stored calibration images 310 which is the RGB valued or valued mosaiced pixelated images of the wide-band spectrum. The wide-band source spectral power listing 350 is also read into amplitude calibrator 142. The source spectral power listing 350 may be acquired from scientific journals in the case of the sun or other celestial object, or in tabulated scientific measurements maintained by testing and measurement facilities. Other sources of calibrated wide-band light such as incandescent, fluorescent, or light emitting diodes (LED) are typically supplied with spectral amplitude calibration data by the manufacturer or calibration facilities. The output of the calibrator is a set of calibration parameters, the source spectral power listing 350 which may be stored in an external calibration storage media 170.

Figure 4:
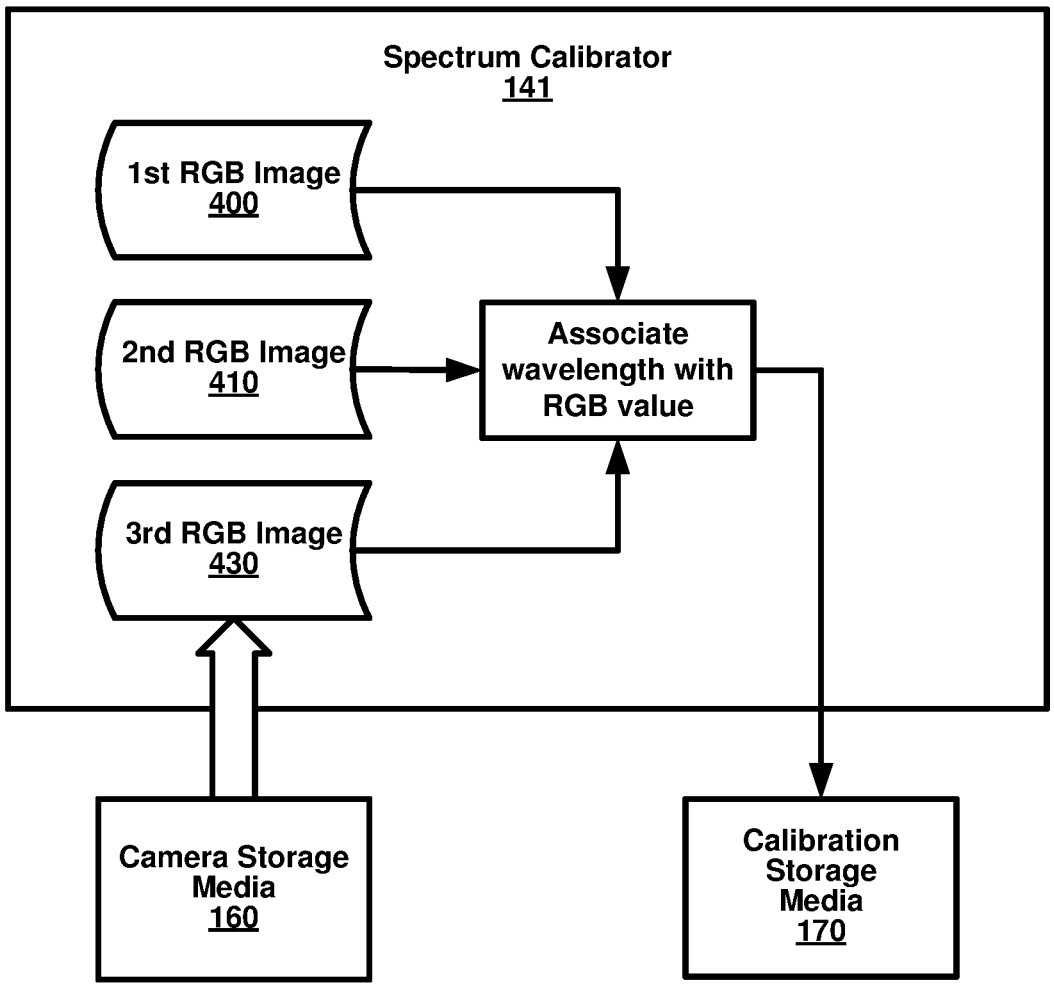
FIG. 4 illustrates a flowchart of the spectrum calibrator functions according to an aspect of an example embodiment of the present disclosure.

FIG. 4 is an expanded view of the spectrum calibrator 141 which associates the wavelengths of the known monochromatic signals that are stored in the first RGB image 400 and the second RGB image 410. The third RGB image 420 contains the spatially distributed spectrum of the wide-band spectral spatial signal. The RGB values of this third RGB image 420 are compared with the RGB values of the first RGB image 400 and second RGB image 410 to assign to the pixels of the third RGB image 420 the known wavelengths to calibrate the pixels. These several spectral pixels of now known wavelengths may be used to interpolate values between them to assign wavelengths to the remainder of the pixels in the spectrum. This may result in a calibration table which is output to the calibration storage media 170.

Figure 5:
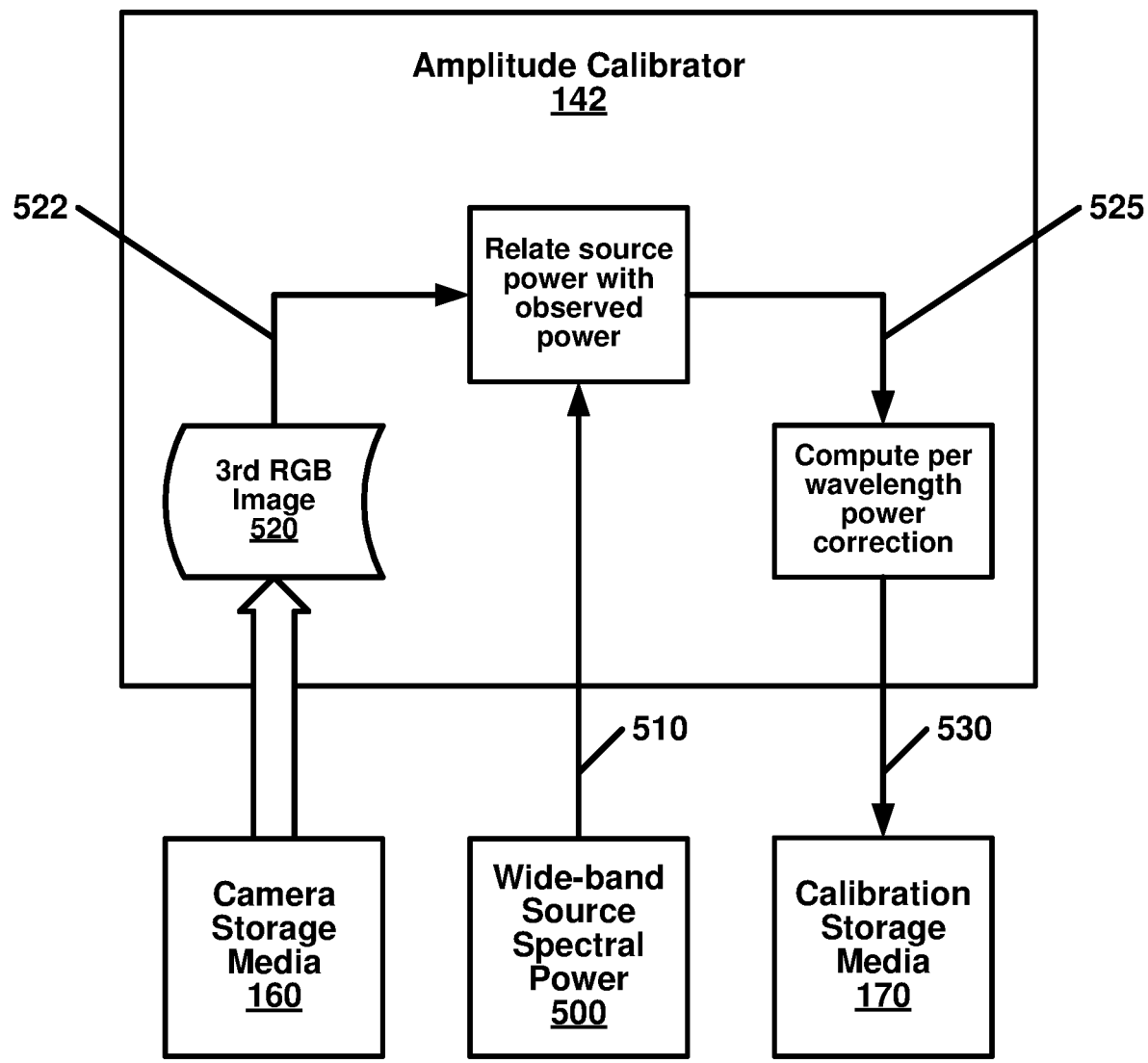
FIG. 5 illustrates a flowchart of the amplitude calibrator functions according to an aspect of an example embodiment of the present disclosure.

FIG. 5 is an expanded view of the amplitude calibrator 142. The RGB amplitude of the spectra's pixels may be read in from camera storage media 160 as the third RGB image 520.

The amplitude calibrator 142 may contain a module which relates the wide-band source spectral power 500 with the observed power from the third RGB image pixels 522 from third RGB image 520. The wide-band source spectral power values 510 are input from the externally supplied wide-band source spectral power 500. The related source power pixels 525 of individual wide-band source spectral power values 510 and third RGB image pixels 522 may be used to compute a per wavelength power correction 530 which is output to a calibration storage media 170 for use in calibrating subsequent, non-calibration raw RGB or mosaiced images taken by the same multispectral imaging system such as a consumer camera.

Figure 6:
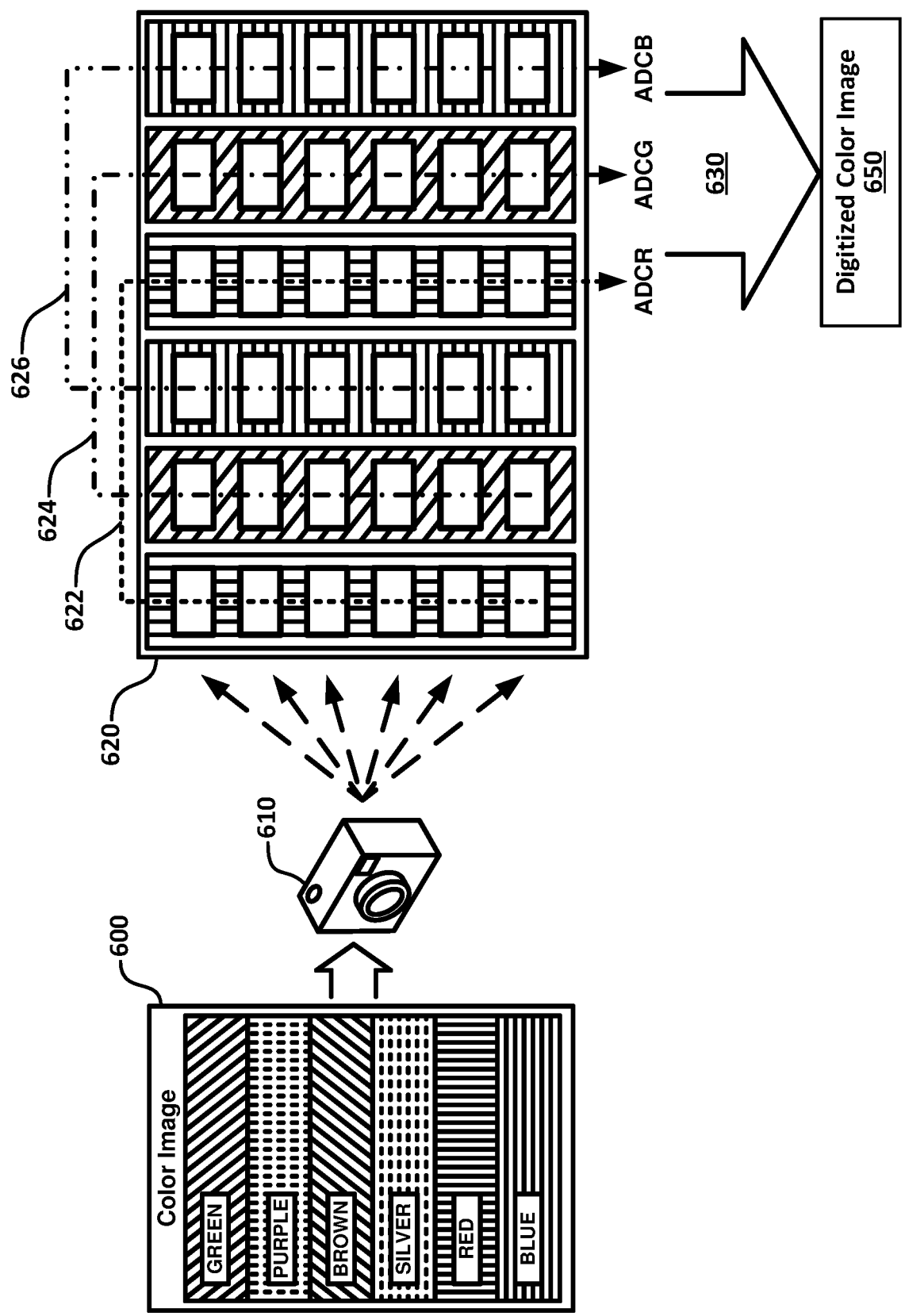
FIG. 6 illustrates the acquisition of a color image by a digital camera according to an aspect of an example embodiment of the present disclosure.

FIG. 6 shows the process of acquiring a digitized color image 650 of a colored scene 600 utilizing a digital camera 610 and how that image is passed through a series of red, green, and blue analog filters to produce the RGB pixel values. These RGB pixel values may be read out and stored as digitized data. The digital camera 610 may be a color camera, an IR camera, or a hyperspectral imaging system. The digital camera 610 may also be a video camera or video imager which acquires a sequence of still images to create moving video images. The lens and focusing mechanism of the video camera 610 projects the image of the colored scene 600 onto the imaging sensor 620. The imaging sensor 620 may be comprised of red, green, and blue filtered pixels representing the colored scene 600. The digital camera 610 may also use a mosaiced imaging sensor 620 which is comprised of a multiplicity of different colored pixels. A typical mosaic of pixels is comprised of red, green, green, and blue pixels alternating in adjacent rows in such a manner as the other color values of an individual can be interpolated such that each red 622, green 624, and blue 626 pixels of the demosaiced image contains values for each of the red, green, and blue tristimulus colors. Other colors and pixel arrangements besides RGB and RGGB may be used. Imaging sensors sensitive to other wavelengths of electromagnetic waves other than those in the visual band may be used in a similar manner to that which is described here for RGB or RGGB. The analog voltages which result from the illumination of the individual sensors are converted to digital values by the analog to digital converters for each color, ADCR, ADCG, and ADCB 630. Other digitizing arrangements are possible such as using the same analog to digital converter to convert all values.

Figure 7:
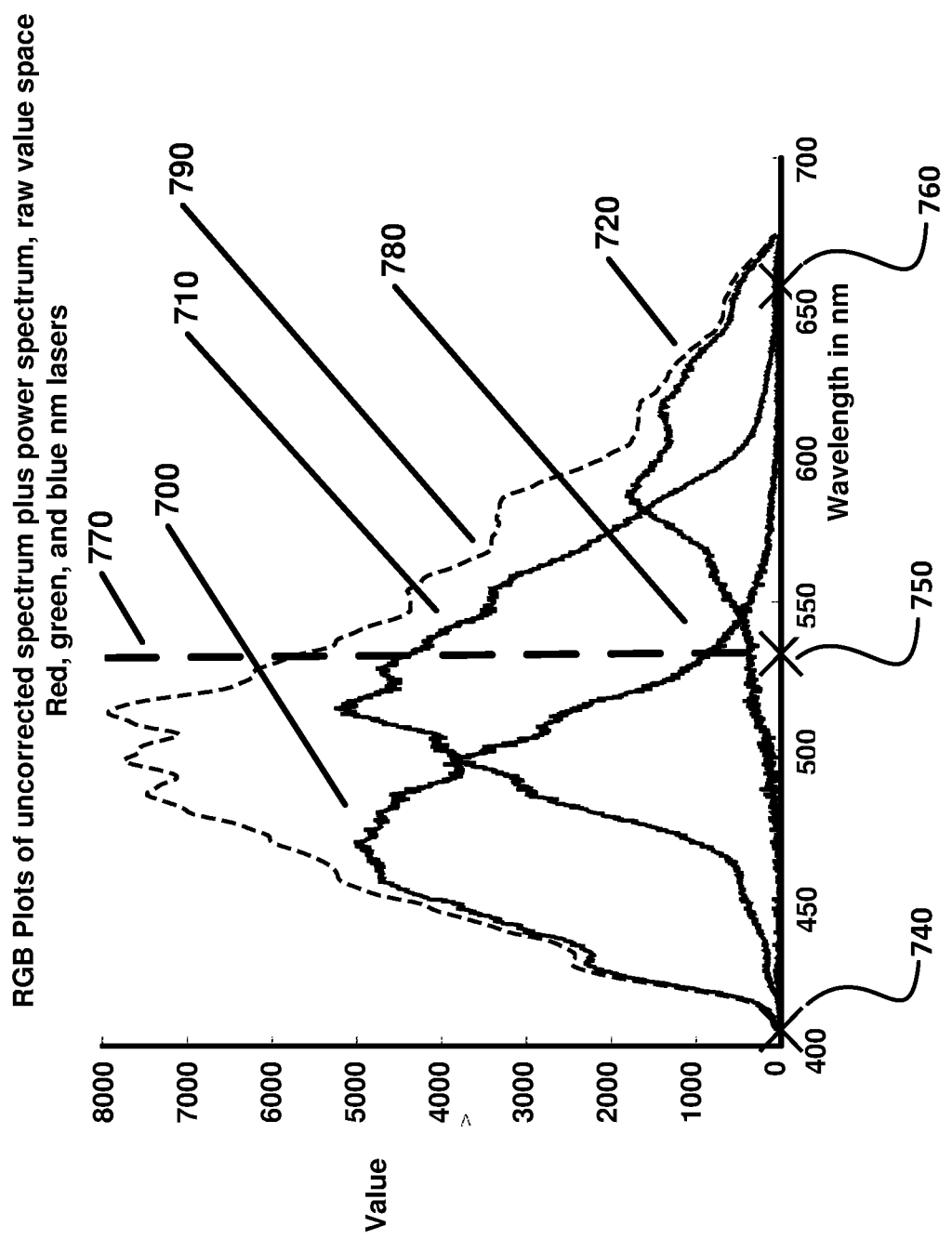
FIG. 7 illustrates the wavelength to red, green, blue mapping of a typical color camera according to an aspect of an example embodiment of the present disclosure.

FIG. 7 shows the spectral response of the multispectral imaging sensor as represented by the red value 720, the green value 710, and the blue value 700. The location of the wavelengths of the monochromatic sources, typically lasers are located at 740 for the 405 nanometer (nm) blue laser, at 750 for the 532 nm green laser, and 760 for the 650 nm red laser. These are not the amplitude, only the wavelengths. It has been demonstrated that generally each of the spectral wavelengths as shown in this graph of real data can be represented by at most two of the RGB values, i.e., RB, RG, or GB. The different spectral wavelengths are decomposable into the ratio of their Red/Blue values, their Red/Green values, or their Green/Blue values. In the event that 3 values are required, each spectral wavelength can be represented by a vector of RGB values. FIG. 7 also shows at the intersection 770 of the dashed line with the green response and the intersection 780 of the dashed line with the blue response that the particular wavelength at 750 may be related with the ratio of the values of green and blue at 770 and 780 of a vector of RGB values. It is this ratio of values or the vector of RGB values that may be used to determine which pixel of the spectrum is at a particular wavelength. The spectrum of pixels does not contain this wavelength information because the imaging sensor does not detect individual wavelengths, but only the ratio of their RG, RB, or GB values. The dashed line 790 shows the envelope of the RGB which is the sum of RGB at each point and represents the power measured at that wavelength.

Figure 8:
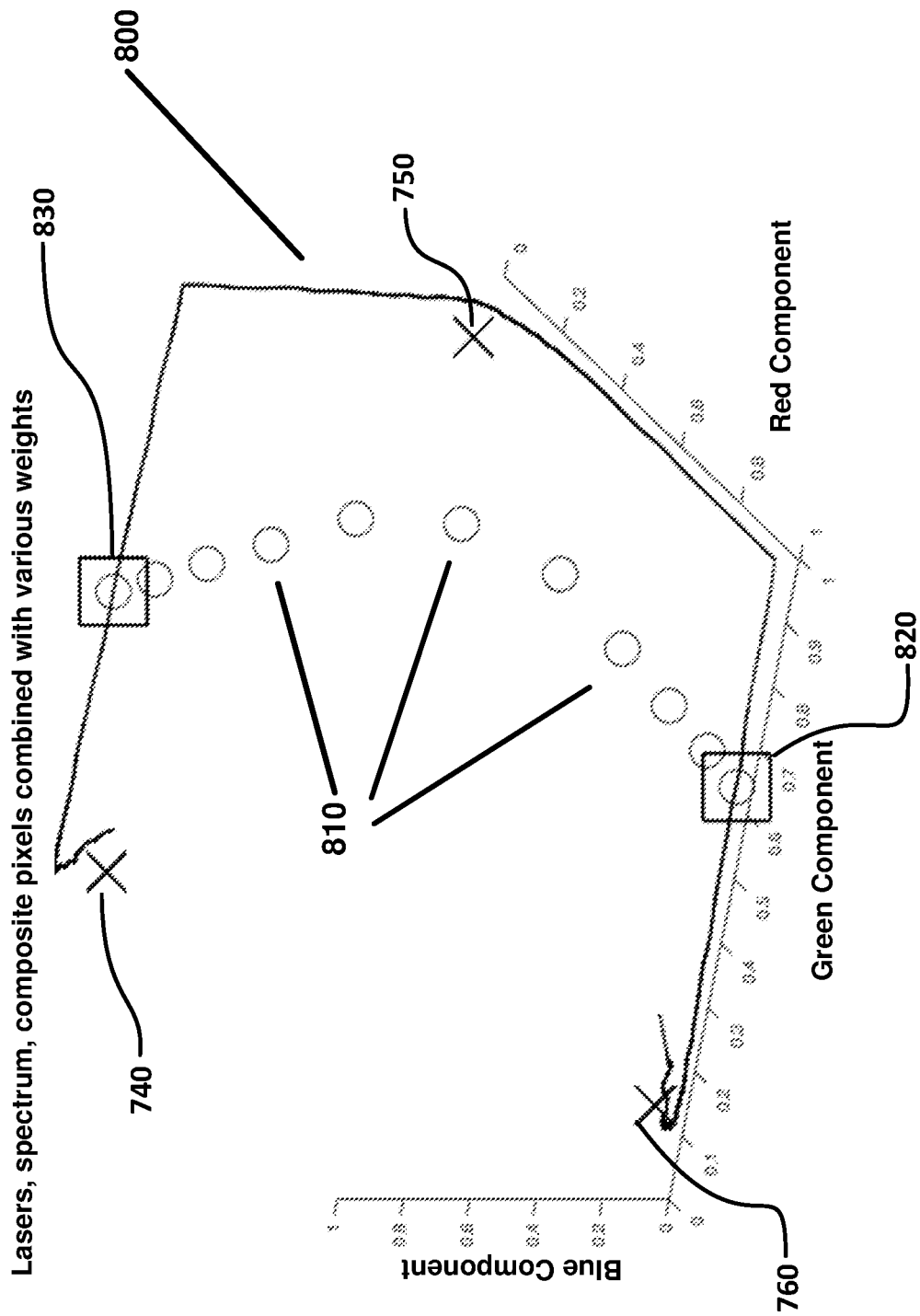
FIG. 8 illustrates the RG, RB, or BG values at different wavelengths as well as RGB values of polychromatic colors according to an aspect of an example embodiment of the present disclosure.

FIG. 8 shows the spectral pixel values of RGB in a unit cube space in which the individual spectral colors are represented by their saturated value of one constituent component while the other value is adjusted to be in the correct ratio as determined by the mapping shown in FIG. 7. For reference, the red laser RGB value 760, the green laser RGB value 750, and the blue laser RGB value 740 are shown in this unit cube space. The individual spectral pixel values 800 are shown to lie along the planes formed by two of the three RGB colors. This allows for the decomposition of the arbitrary polychromatic pixels 810 RGB value into two constituent single wavelength spectral components. The circles pointed to by 810 represent different ratios of same constituent wavelength components as shown in the squares 820 and 830 as they vary from 10 to 90 percent.

Figure 9:
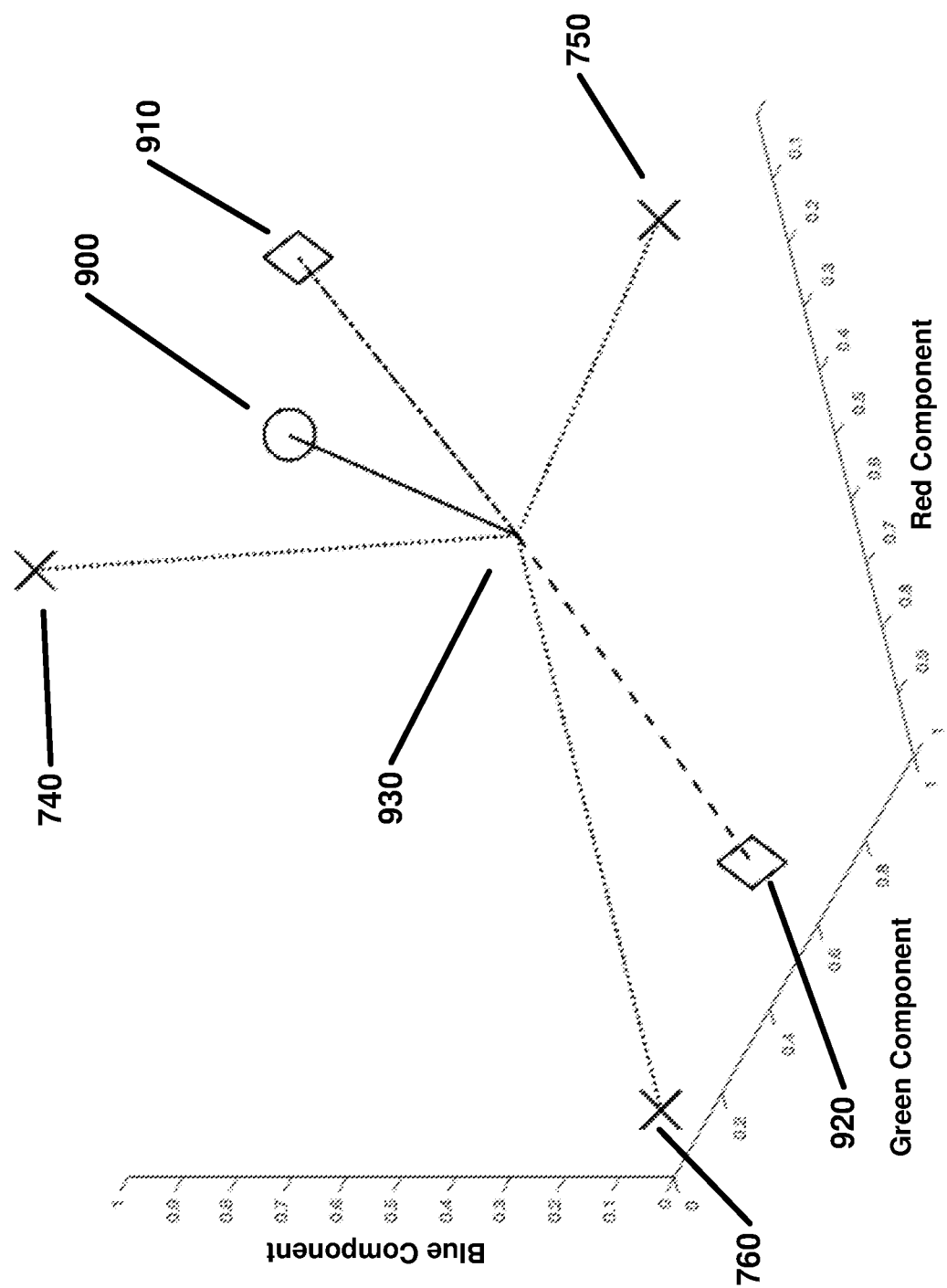
FIG. 9 illustrates the decomposition of an arbitrary polychromatic pixel into its spectral components according to an aspect of an example embodiment of the present disclosure.

FIG. 9 shows the decomposition of a polychromatic RGB value 900 of an arbitrary polychromatic pixel into its spectral wavelength components, 910 and 920. Spectral wavelength components, 910 and 920 are the projections of the polychromatic value 900 onto the green blue and green red planes. The origin of this RGB vector space 930 is at point at which the values of each of the red, green, and blue is zero.

Figure 10:
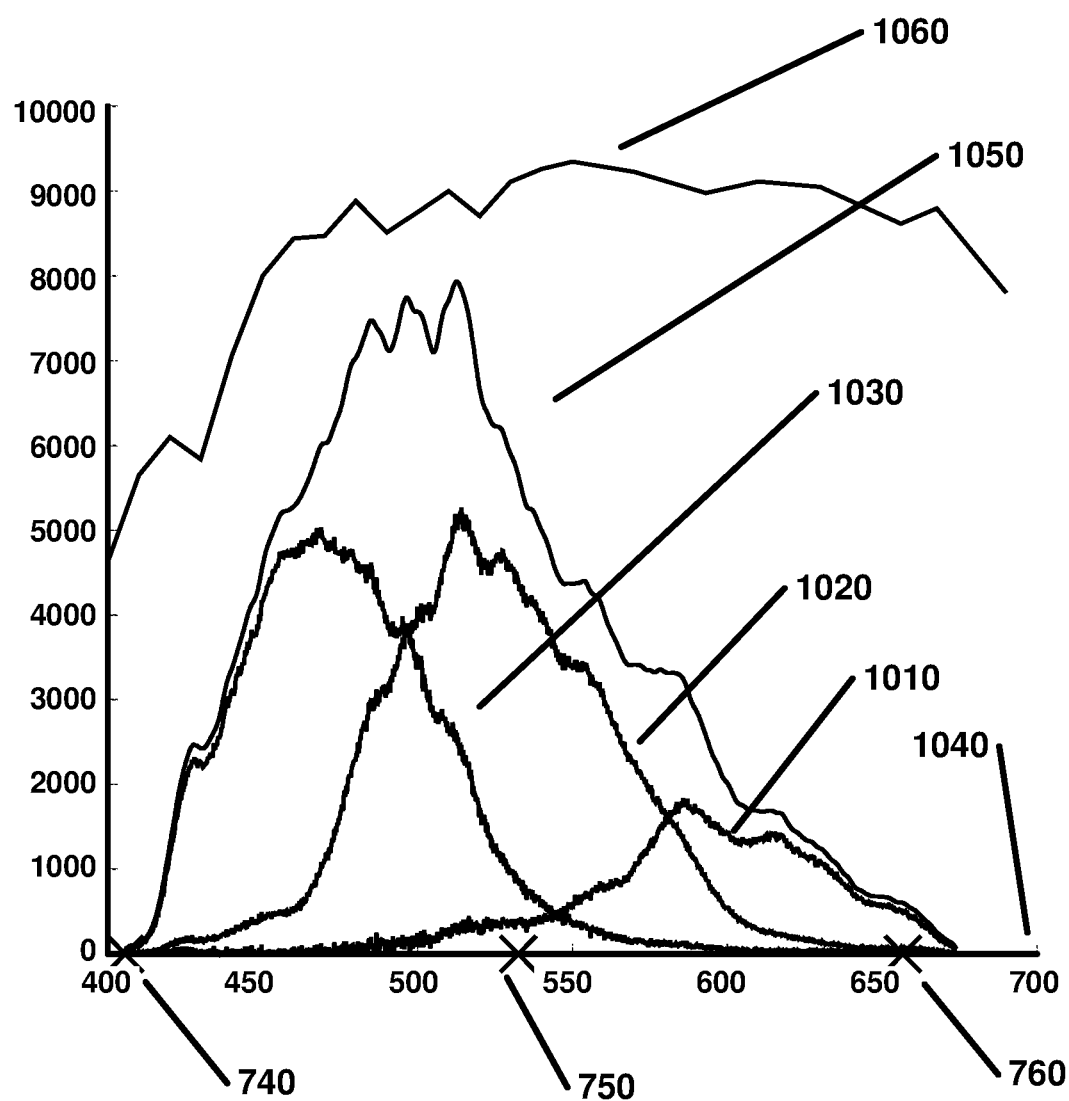
FIG. 10 illustrates the power of the red, green, and blue channels relative to the corrected and uncorrected sun's spectral power according to an aspect of an example embodiment of the present disclosure.

FIG. 10 is a graph of the measured power 1050 as the sum of the RGB values at each of the individual wavelengths before it is corrected to match the known power of the illuminating wide bandwidth light 1060. A calibration coefficient for each wavelength may be derived from these two values. The uncorrected red pixel values 1010, the uncorrected green pixel values 1020, and the uncorrected blue pixel values 1030 at each wavelength are shown in FIG. 10. The wavelength scale 1040 is in nanometers. For reference, the red laser RGB value 760, the green laser RGB value 750, and the blue laser RGB value 740 are shown in this unit cube space.

Figure 11:
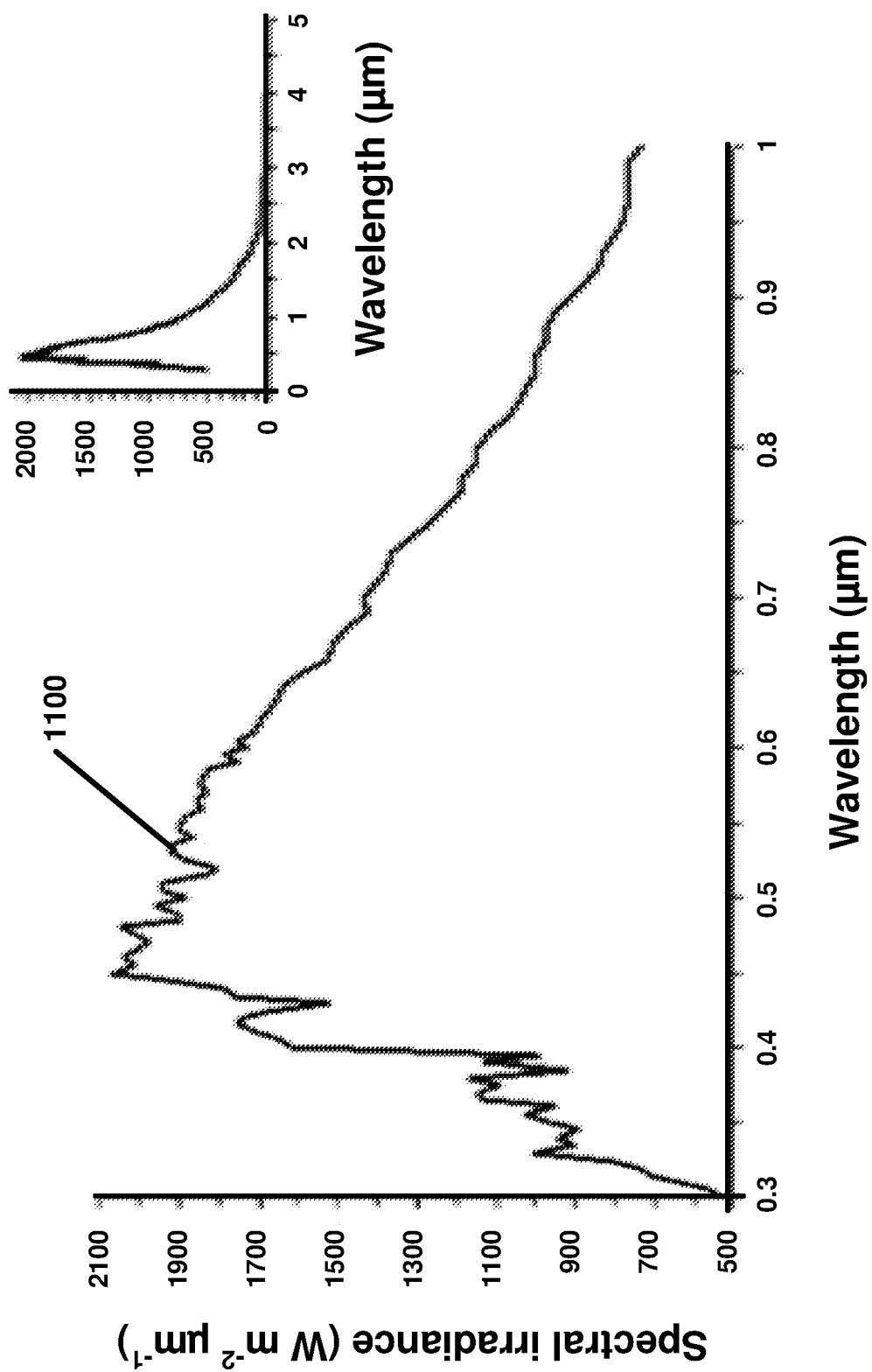
FIG. 11 illustrates the known spectral power of the sun at the earth's surface according to an aspect of an example embodiment of the present disclosure.

FIG. 11 shows an example of the power radiated by the sun, the spectral irradiance 1100. This irradiance is modified by the atmospheric attenuation and location on the earth and time of day to produce the known wide bandwidth power which is used to calibrate the amplitude response of the camera whose calibration coefficients it is desired to know.

Figure 12:
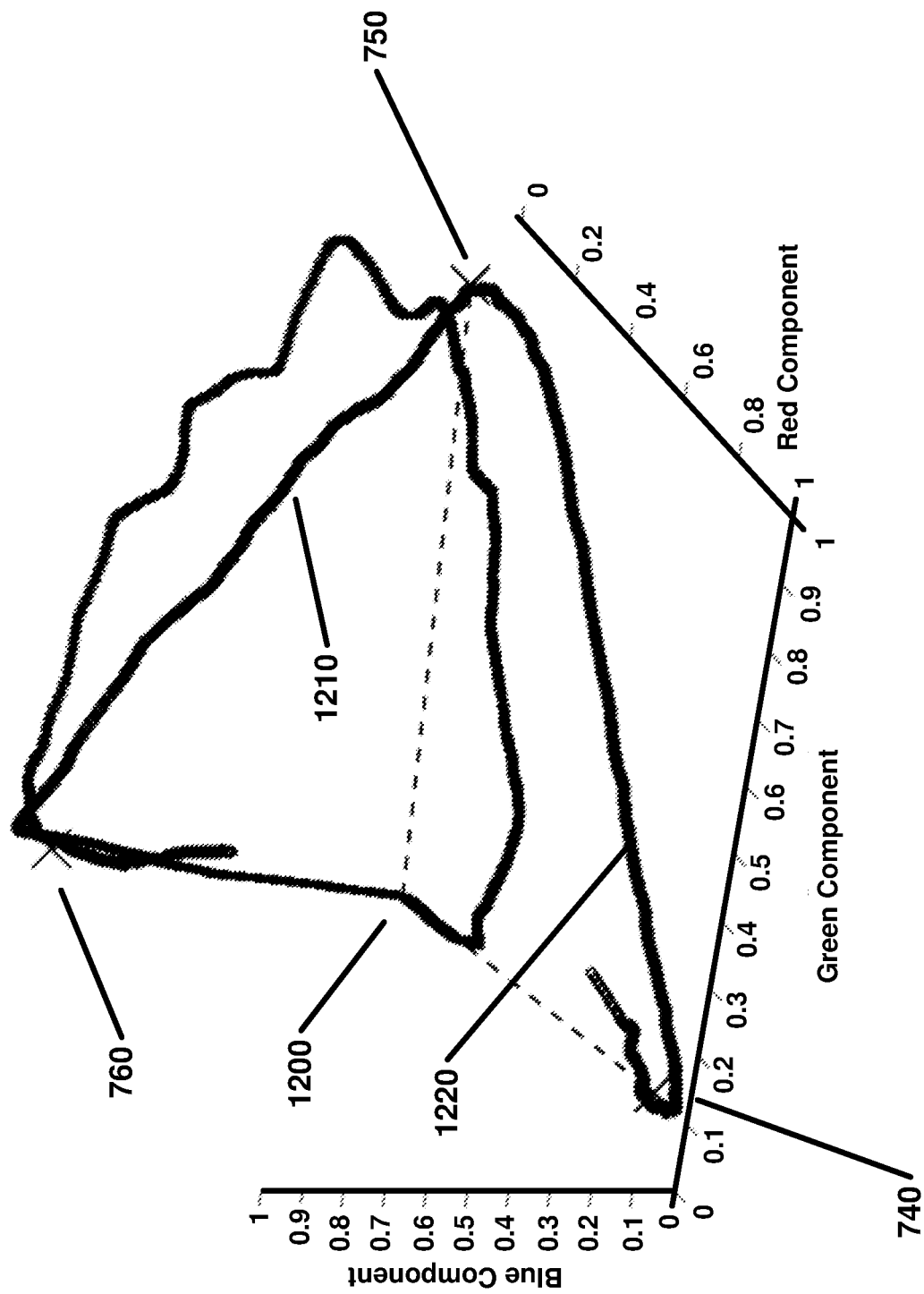
FIG. 12 illustrates the uncorrected and corrected raw RGB amplitudes of the spectral components according to an aspect of an example embodiment of the present disclosure.

FIG. 12 shows real measurements 1210 taken by a physical camera with its red, green, and blue sensors associated with individual wavelength pixels before amplitude calibration is applied. The calibrated RGB values associated with each individual wavelength pixel after application of the calibration coefficients resulting from the apparatus is 1220. The origin of this RGB space is 1200. For reference, the red laser RGB value 760, the green laser RGB value 750, and the blue laser RGB value 740 are shown in this unit cube space.

Figure 13:
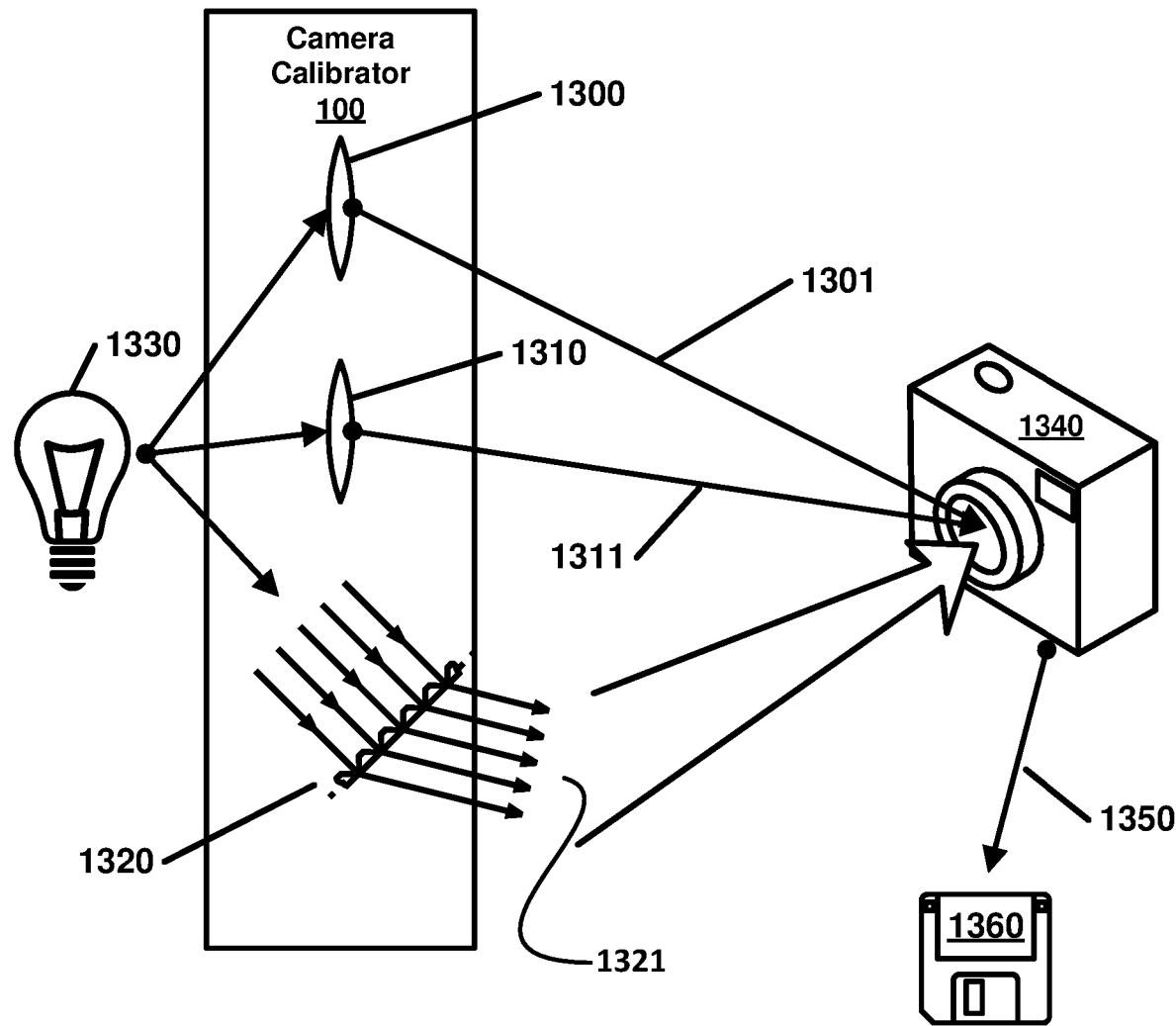
FIG. 13 illustrates the projection of the monochromatic and spectral signals directly into the camera according to an aspect of an example embodiment of the present disclosure.

FIG. 13 shows a notional drawing of the usage of the camera calibrator 100. A wide bandwidth light source 1330 radiates light which travels through optical filter 1300 with known narrow bandwidth characteristics to produce a known narrow bandwidth signal 1301. The narrow bandwidth signal of 1301 is directly imaged by the camera 1340. A similar process occurs for optical filter 1310 and signal 1311 at a different known wavelength. The wide bandwidth light radiated from 1330 is also passed through a transmission diffraction grating 1320 producing a spatially dispersed spectrum 1321 which is also directed to and imaged by the camera 1340. The image of filtered signal 1301 and filtered signal 1311 and spectrum 1321 is output as image file 1350 and stored on storage medium 1360.

Figure 14:
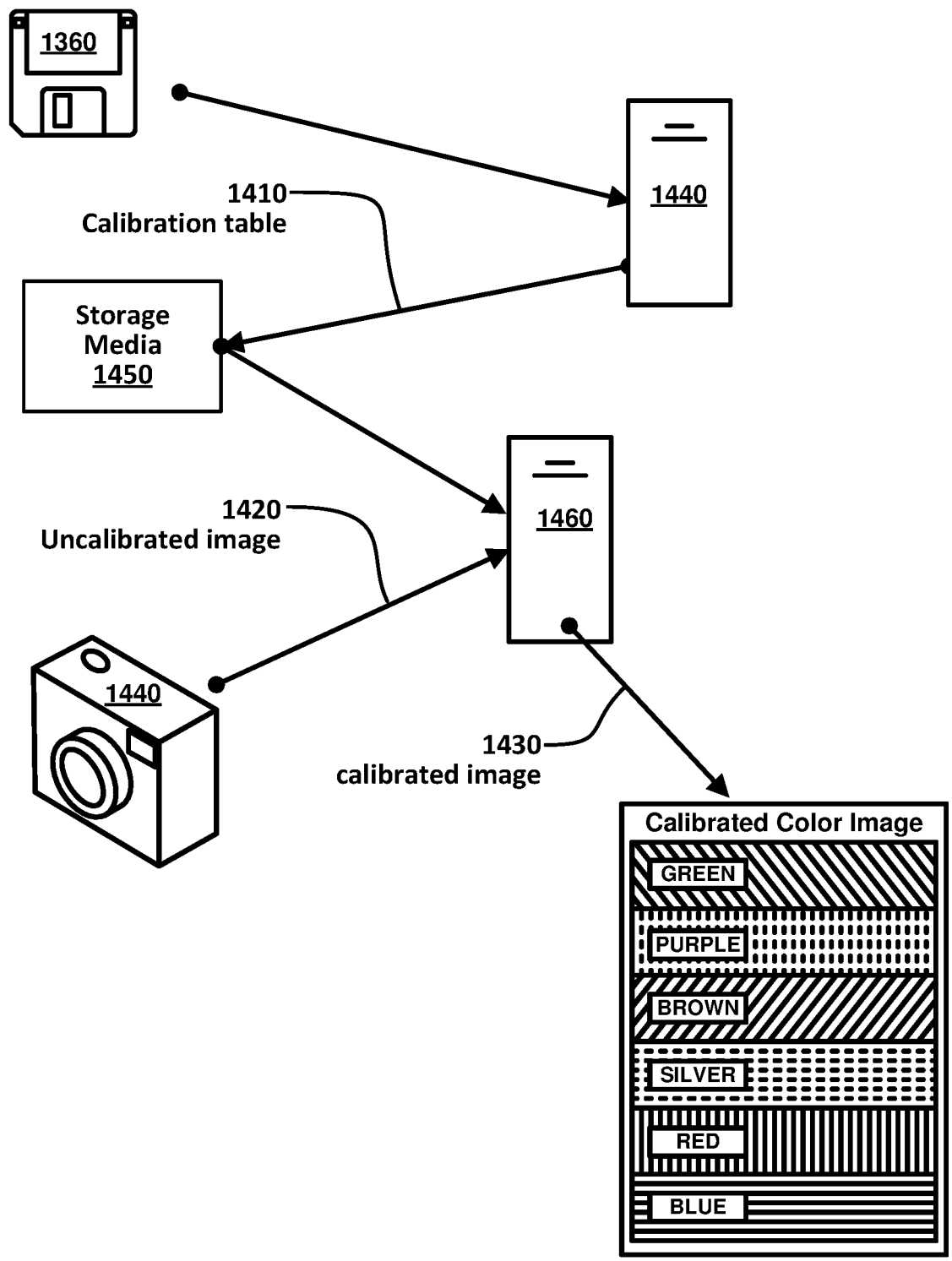
FIG. 14 illustrates the usage of the calibration table to calibrate an arbitrary image according to an aspect of an example embodiment of the present disclosure.

FIG. 14 shows the processing of the calibration image which was stored on storage medium 1360 by processor 1440 to produce the calibration table 1410. Calibration table 1410 may be stored on calibration storage medium 1450. The calibration table may be applied in image calibrator 1460 to the uncalibrated image 1420 to produce a calibrated image 1430. The uncalibrated image 1420 was imaged by the camera 1440. This camera 1440 may use the calibration table 1410 developed on a camera with similar imaging characteristics, e.g., camera 1340.

Figure 15:
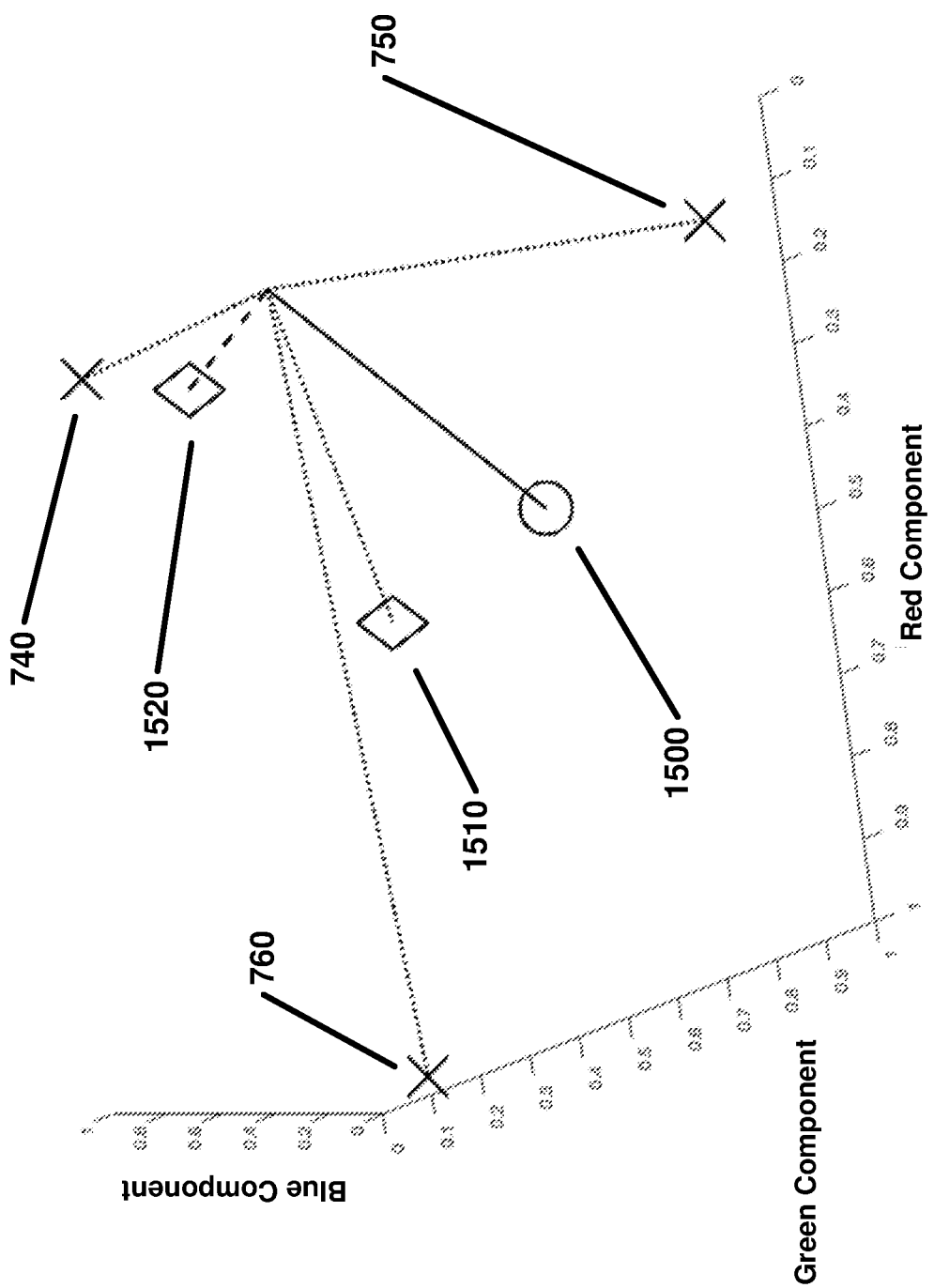
FIG. 15 illustrates the decomposition of an arbitrary polychromatic pixel into its basis vectors according to an aspect of an example embodiment of the present disclosure.

FIG. 15 shows the decomposition of a polychromatic pixel RGB 1500 into its spectral component wavelengths 1510 and 1520. Subsequent processing calibrates the RGB amplitudes. The location of the wavelengths of the monochromatic sources, typically lasers, are located at 740 for the 405 nanometer (nm) blue laser, at 750 for the 532 nm green laser, and 760 for the 650 nm red laser.

Figure 16:
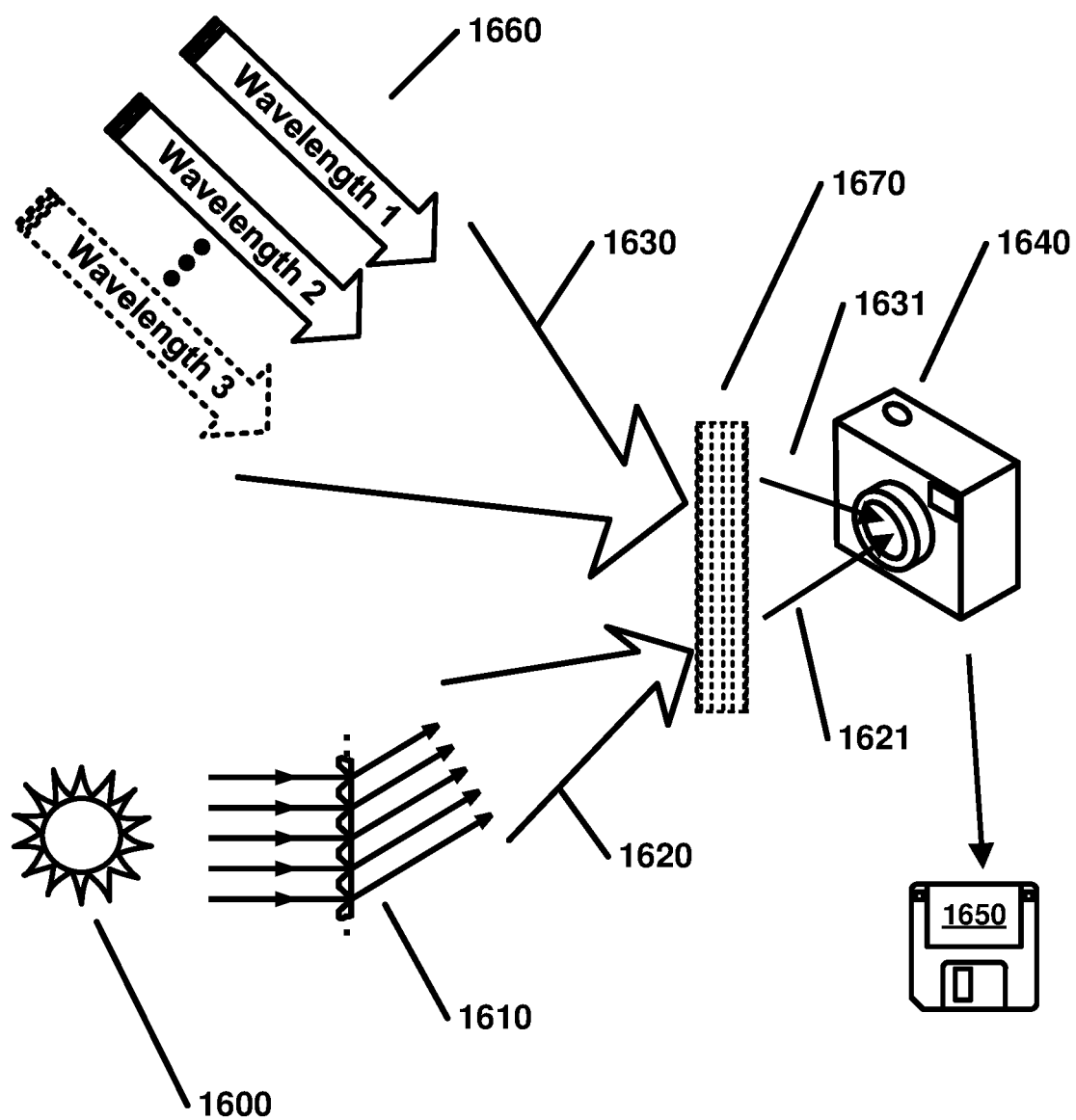
FIG. 16 illustrates the projection of monochromatic light from lasers combined with a spectrum derived from the sun introduced directly into a camera according to an aspect of an example embodiment of the present disclosure.

FIG. 16 is a notional drawing of the components of the camera calibration apparatus and the production of the known wavelength signals 1630 from lasers 1660 comprising at least 2 lasers at a first and second wavelength and possibly more monochromatic sources at other wavelengths. The known wavelength signals may be passed through a neutral density filter 1670 which attenuates the amplitude of the signals without altering their spectral characteristics to produce attenuated known wavelength signals 1631. The wide bandwidth light source 1600 of known spectral power characteristics may be passed through a diffraction grating 1610 to produce the spatially distributed spectral signal 1620. The spatially distributed spectral signal may be passed through neutral density filter 1670 to produce attenuated spatially distributed spectral signal 1621 which is directed to the camera 1640. The resulting image may be stored on storage medium 1650 for further processing.

Figure 17:
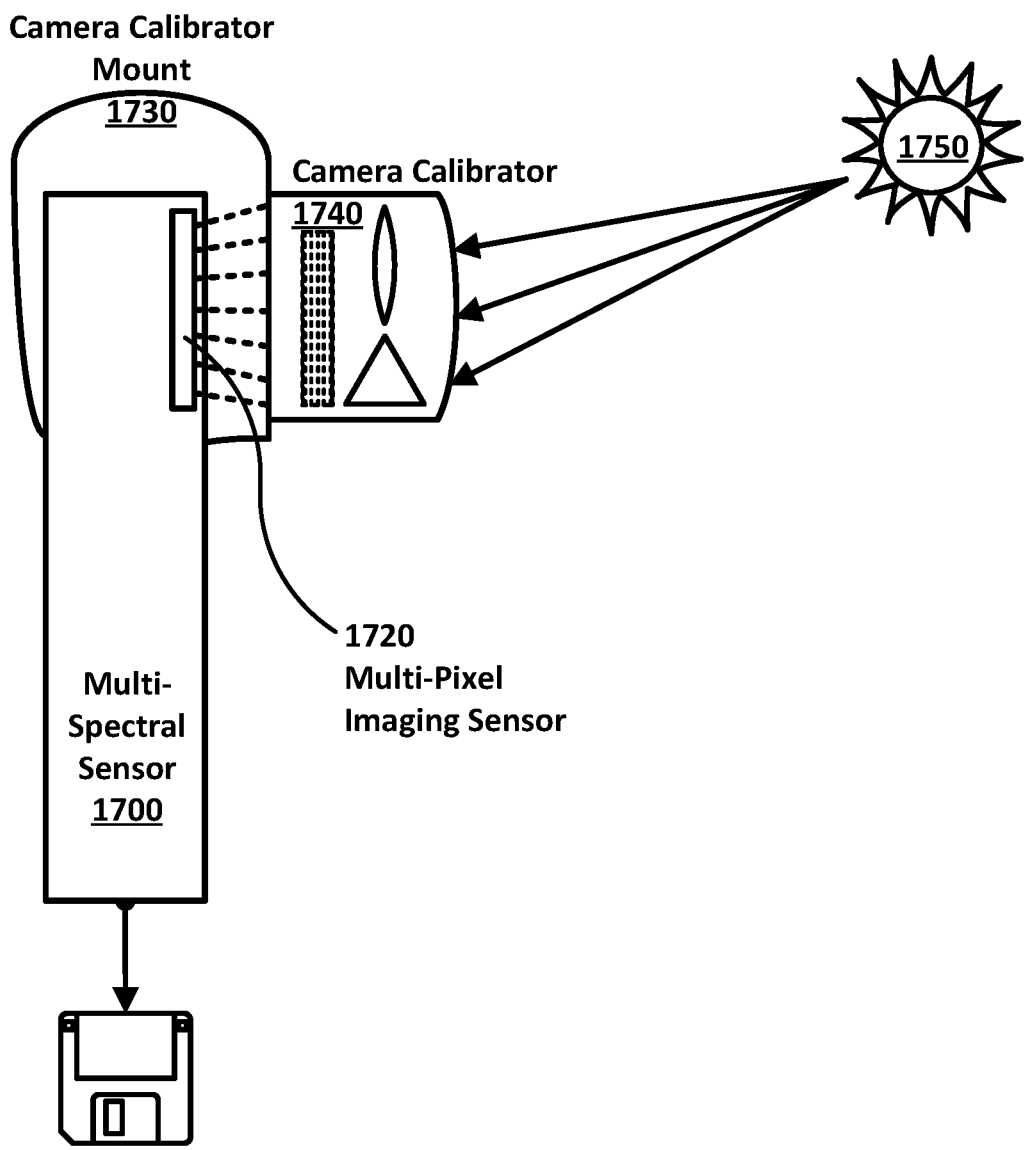
FIG. 17 illustrates a camera calibrator mounted on an imaging device such as a smart camera according to an aspect of an example embodiment of the present disclosure.

FIG. 17 shows another notional view of the usage of the camera calibrator 1740 as an integrated optical apparatus connected to a camera calibrator mount 1730. The mount 1730 may be configured to be readily affixed to a camera which is part of a multispectral sensor 1700 such as a smartphone. The wide bandwidth source 1750 irradiates the camera calibrator 1740 and the resulting filtered narrow band signals and spectrum may be captured by the multipixel imaging sensor 1720.

Figure 18:
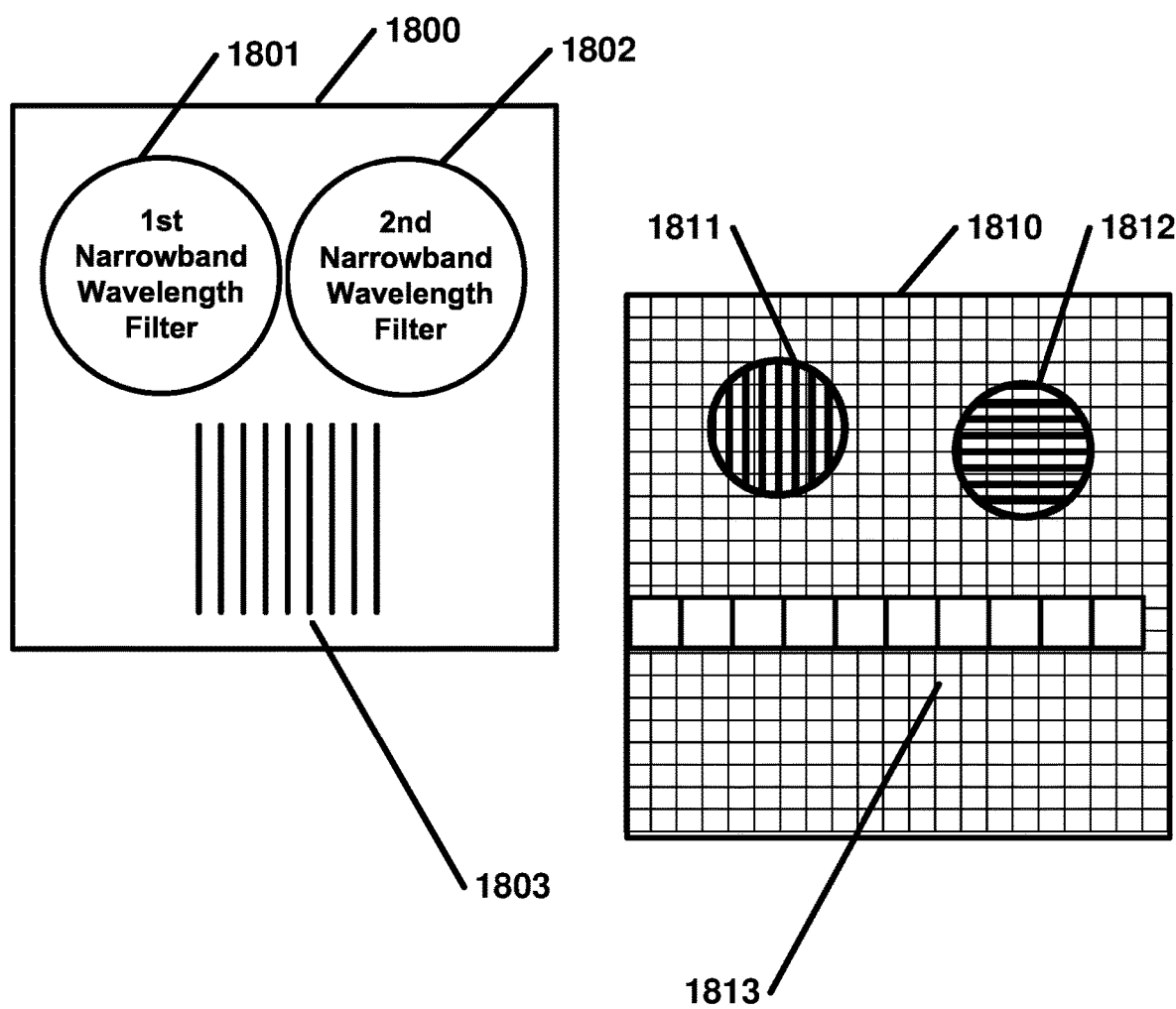
FIG. 18 illustrates a configuration of filters and diffraction grating on a substrate and the resulting image acquired by an imaging system according to an aspect of an example embodiment of the present disclosure.

FIG. 18 shows a substantially planar configuration of an example camera calibrator 1800 containing a first narrowband wavelength filter 1801, a second narrowband wavelength filter 1802, and a diffraction grating 1803. FIG. 18 also shows a typical projection of the output of the first narrowband wavelength filter 1801 to produce the first narrowband signal 1811, the second narrowband wavelength filter 1802 to produce the second narrowband signal 1812 and the output of the diffraction grating 1803 to produce the spatially distributed spectrum 1813 on a pixelated imaging sensor 1810.

Embodiments are operational with numerous other general purpose or special purpose computing system environments or configurations. Examples of well-known computing systems, environments, and/or configurations that may be suitable for use with various embodiments include, but are not limited to, embedded computing systems, personal computers, server computers, hand-held or laptop devices, smart phones, smart cameras, tablets, multiprocessor systems, microprocessor-based systems, set top boxes, programmable consumer electronics, network PCs, minicomputers, mainframe computers, cloud services, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

Figure 19:
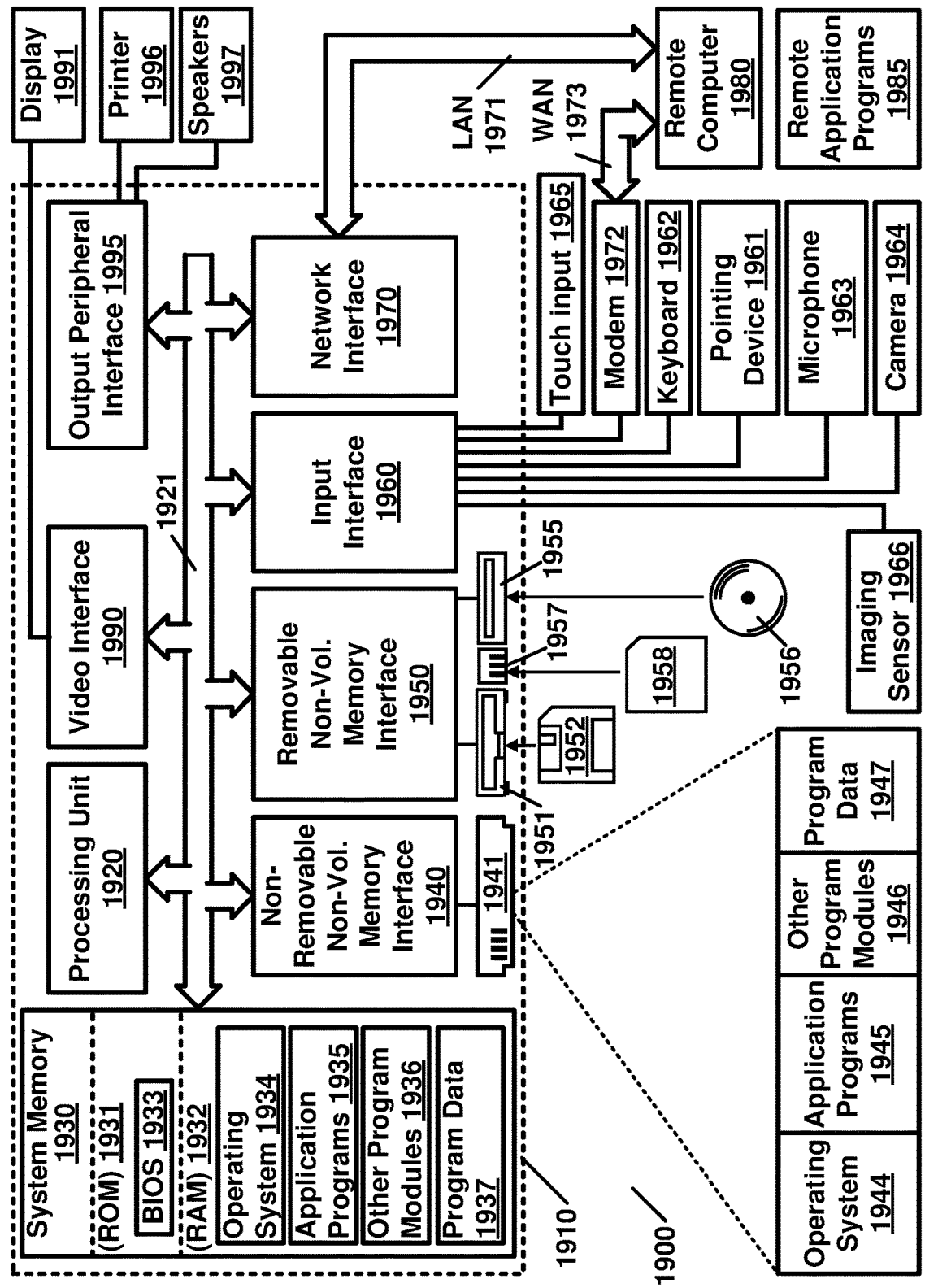
FIG. 19 illustrates an example of a computing system environment on which aspects of some embodiments may be implemented.

With reference to FIG. 19, an example system for implementing some embodiments includes a general-purpose computing device in the form of a computer 1910. Components of computer 1910 may include, but are not limited to, a processing unit 1920, a system memory 1930, and a system bus 1921 that couples various system components including the system memory to the processing unit 1920.

Computer 1910 typically includes a variety of computer readable media. Computer readable media can be any available media that can be accessed by computer 1910 and includes both volatile and nonvolatile media, and removable and non-removable media. By way of example, and not limitation, computer readable media may comprise computer storage media and communication media. Computer storage media include both volatile and nonvolatile, and removable and non-removable media implemented in any method or technology for storage of information such as computer readable instructions, data structures, program modules or other data. Computer storage media include, but are not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer 1910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

The system memory 1930 includes computer storage media in the form of volatile and/or nonvolatile memory such as ROM 1931 and RAM 1932. A basic input/output system 1933 (BIOS), containing the basic routines that help to transfer information between elements within computer 1910, such as during start-up, is typically stored in ROM 1931. RAM 1932 typically contains data and/or program modules that are immediately accessible to and/or presently being operated on by processing unit 1920. By way of example, and not limitation, FIG. 19 illustrates operating system 1934, application programs 1935, other program modules 1936, and program data 1937.

The computer 1910 may also include other removable/non-removable volatile/nonvolatile computer storage media. By way of example only, FIG. 19 illustrates a hard disk drive 1941 that reads from or writes to non-removable, nonvolatile magnetic media, a magnetic disk drive 1951 that reads from or writes to a removable, nonvolatile magnetic disk 1952, a flash drive reader 1957 that reads flash drive 1958, and an optical disk drive 1955 that reads from or writes to a removable, nonvolatile optical disk 1956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1941 is typically connected to the system bus 1921 through a non-removable memory interface such as interface 1940, and magnetic disk drive 1951 and optical disk drive 1955 are typically connected to the system bus 1921 by a removable memory interface, such as interface 1950.

The drives and their associated computer storage media discussed above and illustrated in FIG. 19 provide storage of computer readable instructions, data structures, program modules and other data for the computer 1910. In FIG. 19, for example, hard disk drive 1941 is illustrated as storing operating system 1944, application programs 1945, program data 1947, and other program modules 1946. Additionally, for example, non-volatile memory may include instructions to, for example, discover and configure IT device(s); the creation of device neutral user interface command(s); combinations thereof, and/or the like.

Commands and information may be entered into the computing hardware 1910 through input devices such as a keyboard 1962, a microphone 1963, a camera 1964, imaging sensor 1966 (e.g., 1520, 1492, and 1340) and a pointing device 1961, such as a mouse, trackball or touch pad. These and other input devices are often connected to the processing unit 1920 through an input interface 1960 that is coupled to the system bus, but may be connected by other interface and bus structures, such as a parallel port, game port or a universal serial bus (USB). A monitor 1991 or other type of display device may also be connected to the system bus 1921 via an interface, such as a video interface 1990. Other devices, such as, for example, speakers 1997, printer 1996 and network switch(es) 1998 may be connected to the system via peripheral interface 1995.

The computer 1910 is operated in a networked environment using logical connections to one or more remote computers, such as a remote computer 1980. The remote computer 1980 may be a personal computer, a hand-held device, a server, cloud storage, one or more cloud computers, a router, a network PC, a peer device or other common network node, and typically includes many or all of the elements described above relative to the computer 1910. The logical connections depicted in FIG. 19 include a local area network (LAN) 1971 and a wide area network (WAN) 1973, but may also include other networks. Such networking environments are commonplace in offices, enterprise-wide computer networks, intranets and the Internet.

When used in a LAN networking environment, the computer 1910 is connected to the LAN 1971 through a network interface or adapter 1970. When used in a WAN networking environment, the computer 1910 typically includes a modem 1972 or other means for establishing communications over the WAN 1973, such as the Internet. The modem 1972, which may be internal or external, may be connected to the system bus 1921 via the user input interface 1960, or other appropriate mechanism. The modem 1972 may be wired or wireless. Examples of wireless devices may comprise, but are not limited to: Wi-Fi and Bluetooth. In a networked environment, program modules depicted relative to the computer 1910, or portions thereof, may be stored in the remote memory storage device. By way of example, and not limitation, FIG. 19 illustrates remote application programs 1985 as residing on remote computer 1980. It will be appreciated that the network connections shown are exemplary and other means of establishing a communications link between the computers may be used. Additionally, for example, LAN 1971 and WAN 1973 may provide a network interface to communicate with other distributed infrastructure management device(s); with IT device(s); with users remotely accessing the User Input Interface 1960; combinations thereof, and/or the like.

Consumer cameras generally take images covering the human visual band (human visual spectrum) which is generally considered to be over the range of wavelengths from 370 nanometers (nm) to 730 nm with slight excursions at either end of the human visual spectrum.

The optical spectrum or optical band may encompass electromagnetic radiation or electromagnetic wave with wavelengths in the range from 10 nm to $10^3$ µm, or frequencies in the range from 300 GHz to 3000 THz or some part thereof.

A monochromatic color is one which is comprised of a single wavelength and/or a narrow bandwidth of wavelengths around a monochromatic wavelength. For example, according to one embodiment, the narrow bandwidth of wavelengths around a monochromatic wavelength may be within a small percentage of the monochromatic wavelength. The spectrum produced by a refractive prism or a diffraction grating of a broad-band light source may comprise individual monochromatic wavelengths. Humans can not only see these monochromatic spectral colors, but can also assign color names to polychromatic colors. An example of a monochromatic light source is the light produced by a laser. Specific laser wavelengths which may be used for spectral calibration of camera occur as red at 650 nm, green at 532 nm, and blue at 405 nm. Lasers at other wavelengths may be suitable provided they are sufficiently distributed across the wavelength range of the camera's spectral sensitivity.

A polychromatic color is one which is comprised of more than a single, monochromatic wavelength. Polychromatic color(s) may be decomposed into two monochromatic colors where the monochromatic colors are each specified by its wavelength and relative amplitude.

The term signals as used can have any of several meanings and is specifically interpreted in the context within which it is used in this document. For example, a signal may comprise a detectable physical quantity or impulse (such as a voltage, current, or magnetic field strength) by which messages or information can be transmitted; and/or different types of radiation.

A signal is generally produced by a source of the signal. The source may comprise a number of material objects. For example, a source may comprise an artificial lamp. For example, a source may comprise natural radiating objects such as the sun. For example, a source may comprise a laser. For example, a source may be comprised of one or more light emitting diodes (LED). For example, a source may comprise a maser.

Analog to digital converters (ADC) translate analog electrical signals into digital signals for data processing or storage purposes. Analog signals are continuously valued in time and amplitude. Digital signals are discretely valued in time and amplitude. ADC may be used to convert the currents or voltages generated in light sensitive electronics or sensors into an equivalent digital signal.

Precision and accuracy are two ways that scientists think about error. Accuracy refers to how close a measurement is to the true or accepted value. Precision refers to how close measurements of the same item are to each other.

Calibration is the comparison of measurement values delivered by a device under test with those of a calibration standard of known accuracy. Such a standard could be another measurement device of known accuracy, a device generating the quantity to be measured such as a voltage, a sound tone, or a physical artifact, such as a meter ruler. The device under test may be a consumer camera or other multispectral imaging systems.

The tristimulus system is a system for visually matching a color under standardized conditions against the three primary colors namely red, green, and blue. The three results are expressed as X, Y, and Z, respectively, and are called tristimulus values.

To create a full color image, it is typical to use three analog filters to bandlimit the light into three colors sometimes called the three primary colors. These band limited signals, typically red, green and blue, may be directed to different but adjacent pixels in order to measure the intensity in each of these bands. Polychromatic colors may be produced by combining the values from each of the red, green, and blue bands to produce any arbitrary color. Alternatively, spinning analog filters, e.g., theatrical gels, may be synchronized with the image capture process to acquire separate images in each of the several analog filter bands.

A diffraction grating is an optical component with a periodic structure that splits and diffracts light or other electromagnetic radiation into several beams travelling in different directions. A diffraction grating can be either a reflection or a transmission grating. A reflective grating has grating lines inscribed or etched onto a reflective surface and the spectrum is reflected from the grating surface which spatially distributes the several wavelengths. A transmission grating has grating lines inscribed or etched onto a transparent surface and the spectrum is transmitted through the grating surface into a spatial distribution of wavelengths.

A monochromator is an optical device that transmits a mechanically or electrically selectable narrow band of wavelengths of light or other radiation chosen from a wider range of wavelengths available at the input. A monochromator is typically used as a calibration source because it is capable of producing monochromatic signals across the entire visible spectrum.

The amplitude response of an imaging system may be the observed power per unit area over a limited band of wavelengths. Typical units of observed power are Watts meter$^{-1}$ nanometer$^{-1}$.

An optical prism may comprise a transparent optical element with flat, polished surfaces that refract light. At least one surface must be angled as elements with two parallel surfaces are not prisms. The traditional geometrical shape of an optical prism is that of a triangular prism with a triangular base and rectangular sides, and in colloquial use "prism" usually refers to this type. Some types of optical prism are not in fact in the shape of geometric prisms. Prisms can be made from any material that is transparent to the wavelengths for which they are designed. Typical materials include glass, plastic, and fluorite.

Multiplicity is a large countable number which may be initially unknown.

The red, green, and blue (RGB) values of a pixel can be acquired simultaneously in an array of clustered pixels which are exposed to polychromatic light at the same time. RGB values can also be measured sequentially and still be referred to as a single pixel with red, green, and blue values. This sequentially scanning can be done with a monochrome imaging system which has colored filters sequenced in front of it.

An RGB measurement is comprised of a red value, a green value, and a blue amplitude value. An RGB measurement is usually associated with a single pixel even though the actual values may be acquired by individual sensors which spatially near, but not coincident with each other.

A pixel is made up of red, green, and blue numerical values.

A mosaiced image may be made up of red, green1, green2, and blue or other numerical values. A typical mosaic pattern is referred to as RGGB, although other configurations are well known and used in the art. The mosaiced image is a raw image containing the voltage created due to impinging photons after being filtered by an optical band-pass filter. Generally a mosaiced image has not had any processing applied to it such as demosaicing or white balance. In demosaicing, the adjacent colored pixels may be used to interpolate the value of the colors other than that pixel's color itself. This results in an RGB image, sometimes called a tristimulus image. In white balance the relative values of RGB are adjusted to correct the color temperature in the image.

A source of monochromatic light of a desired wavelength can be the result of passing a wide bandwidth light signal comprising a monochromatic wavelength through a narrow bandwidth filter substantially centered at the monochromatic wavelength. Typical narrow bandwidth optical filters may be made by coating an optical surface with a coating which is of a specified thickness. These are called interference filters. Other types of narrow bandwidth filters are readily available.

According to an embodiment, substantially planar means that to a great or significant extent or for the most part that two or more items are aligned and oriented in a single Cartesian plane. According to an embodiment, substantially planar can also mean that the substrate can definitely be slightly uneven, i.e., for example, slightly curved. Substantially linear could also mean piece-wise linear.

A metric space is a set together with a metric on the set. A metric is a function that defines a concept of distance between any two members of the set, which are usually called points. A point considered here may be a vector comprised of the ordered set of values, namely the red, green, and blue values of a spectral pixel at a particular wavelength or a color pixel at a polychromatic value. A familiar metric space is a 3-dimensional Euclidean space and the three dimensions may be the red, green, and blue dimensions. This is typically called the L2 Norm. The Euclidean metric defines the distance between two points as the length of the straight line segment connecting them. There are other distance metrics including Hausdorff, city block, or Manhattan distance to name a few. The shortest distance or closeness metric between a first point and a second point may be a distance in which the computed distance between the first point and a second point is less than the distance between the first point and any other point in the set.

The vector projection of a vector a on (or onto) a nonzero vector b, also known as the vector component or vector resolution of a in the direction of b, is the orthogonal projection of a onto a straight line parallel to b. It is a vector parallel to b, defined as: $\vec{a}_1 = a_1 \hat{b}$ is a scalar, called the scalar projection of the vector $\vec{a}_1$ onto the vector $\hat{b}$, and $\hat{b}$ is the unit vector in the direction of $\hat{b}$.

An arbitrary vector in a metric space may be decomposed into its components vectors aligned with the unit vectors utilizing projections. Components vectors may also be referred to as basis vectors. The component vector with the maximum value is that projection which also has the shortest distance to the arbitrary vector.

Calibration data such as described in this application may be used to modify arbitrary images of raw pixel values such that their pixel values are scientifically accurate measures of the incident light in an agreed upon system of units.

The method described here for obtaining the calibration coefficients may also be used to decompose pixels of an arbitrary image into its two component wavelengths along with their values as a means of producing a compressed image. Such a compressed image may reduce the total amount of data which is required to transfer the image data over a transmission medium or into a storage medium for further retrieval.

In physics, electromagnetic radiation (EM radiation or EMR) refers to the waves (or their quanta, photons) of the electromagnetic field, propagating (radiating) through space, carrying electromagnetic radiant energy. EMR includes radio waves, microwaves, infrared, visible light, ultraviolet, X-rays, and gamma rays. An electromagnetic radiation may also be referred to as an electromagnetic wave.

Optical means operating in or employing the visible part of the electromagnetic spectrum.

The wavelengths of monochromatic or polychromatic pixels may be represented in a normalized vector space particularly when analyzing a pixel for its wavelength components without regard for the amplitude of the components. A unit vector space may take on at least two forms. The first form is one in which each pixel's vector value in RGB space is normalized to a length of one. We refer to that as the unit vector space. The second form is one in which each pixels' value in RGB space is normalized by dividing the value of each of the red, green, or blue values by the value of its maximum component, i.e., either red or green or blue. We call this the unit cube space.

Either unit cube or unit value space is adequate for performing spectral decomposition of a polychromatic pixel. The choice of which method to use may be, for example, for programming convenience. The difference between unit vector and unit cube spaces is when amplitude of a pixel is taken into account. If unit cube space represents one in which pixels are saturated to their maximum color value. For example, the spectral color yellow represented in a unit vector space when visualized on an RGB display appears visually dark while the mathematical ratio of the red to green to blue values describes the spectral color yellow. The spectral color yellow represented in unit cube space when visualized on an RGB display appears visually as the color yellow, i.e., fully saturated. In the unit cube space the mathematical ratio of the red to green to blue values describes the spectral color yellow as it does in the unit vector space.

Color component measurements may be red, green, blue (RGB), cyan, magenta, yellow (CYM), tristimulus values, or other set of color values.

A broad bandwidth light source may be spectrally dispersed to decompose it into its constituent spectral components by passing the broad bandwidth light source through a prism or a transmission diffraction grating or reflecting the broad bandwidth light source off of a reflective diffraction grating. Droplets of water may produce a spectral decomposition of light. Light refracted by raindrops may produce an atmospheric rainbow.

Light of different wavelengths produced by a spectrally dispersive filter may also be dispersed in space or, as the term is used here, spatially dispersed. An optical dispersive filter is a spectrally dispersive filter. This spatial dispersion of the spectrally dispersed light results in different wavelengths of light impinging on different regions of an imaging sensor by spatially distributing different wavelengths of electromagnetic radiation. Electromagnetic radiation may be comprised of energy at any of a wide range of wavelengths to, but not including, non-ionizing radiation. If the imaging sensor is pixelated, then the wavelengths of light associated with the very narrow bandwidths of light may be captured by each pixel.

The application of the calibration coefficients to a raw image may produce an image which is an accurate representation of the scene being imaged. The technique of image decomposition into two basis wavelengths and their associated amplitude may also be used to store, compress, or otherwise encode the images. Utilizing this technique, each pixel of the calibrated image may be decomposed into four values. These four values are the first wavelength and its amplitude and the second wavelength and its amplitude. This quadruple of values may then be stored and/or transmitted and used for reconstruction of the image on an RGB, cyan, magenta, and yellow (CMT), tristimulus, or other image reconstruction device.

The spatial quantization of the spectrum onto a measured number of pixels provides the number of nanometers of wavelengths per pixel which is possible. The analog to digital converter (A/D) which quantizes the amplitude of each of the RGB or RGGB mosaiced values in a pixel may affect the dynamic range. The fidelity of the image stored in the two basis wavelengths/values (L1, A1, L2, A2 or LA1, LA2) may determine the quality of the reconstructed image and the amount of compression that is possible. Other means of compression may be applied to this LA1, LA2 encoded image such as run length encoding, transform encoding, chroma subsampling, or fractal compression. Other known compression techniques may be improved by utilizing this representation scheme which has fewer values to represent the final color.

Calibration of a multispectral imaging sensor may also be applied to multispectral video imaging systems such as color video cameras, dual-band thermal imaging systems, or web camera.

A calibrated camera may be used to calibrate a monitor by comparing the output of the monitor with the original image. Also, the camera may be used to take an image of a monitor and used to adjust the output of the monitor based on the calibrated image. This calibrated image may be recursively displayed on the monitor until there is no perceptible difference.

According to an embodiment a method calibrating a camera may contain a multispectral imaging system which is a color video camera. Also, at least three distinct imaging sensor signals may comprise at least a red signal, a green signal, and a blue signal. The monochromatic image captured by the imaging device may be within the human visual band.

According to an embodiment, the distance between two or more multispectral imaging sensor signal values may be computed utilizing various mathematical methods including an L2 norm measure between unit or other vector representation of pixel values; an L2 norm measure between unit or other cube representation of pixel values; a city block distance measure between unit or other vector representation of pixel values; and a projection of a first vector onto a second vector which produces a resultant maximum value.

According to an embodiment, monochromatic signals used for calibration may either be generated by passing wide bandwidth light through extremely narrowband filters with known center frequencies. Monochromatic signals may also be generated by tunable lasers or a multiplicity of single wavelength lasers or lasers used in combination with narrowband filters. Narrow bandwidth may mean when a narrowband channel is a channel in which the bandwidth of the filter does not significantly exceed the channel's coherence bandwidth. It may also mean that the number of wavelengths between the half power points (-3 dB) of the filter is small compared with the center wavelength.

According to an embodiment, a source of wide bandwidth light signal may be the sun or other wide bandwidth optical signal with known spectral characteristics. Additionally, if the geospatial location and atmospheric properties of the imaging sensor is known when the image of the sun is taken, the received power can be calculated utilizing known scientific principles or retrieved from data produced by scientific institutions.

According to an embodiment, The necessary narrowband signals of known center wavelength and dispersion of the wideband light can be produced by an apparatus comprised of a first narrow bandwidth electromagnetic wave filter, a second narrow bandwidth electromagnetic wave filter, and an electromagnetic wave dispersive filter. The known center wavelength is generally considered to be the wavelength at which the transmission of energy through the filter attenuates it the least. This optical apparatus may be implemented on a single or multiple substrates. This optical apparatus may be manufactured by modifying a single substrate and not require the addition of other optical components to the substrate.

According to an embodiment, the apparatus may be configured to project a first filtered light signal from a wide bandwidth source to at least a first portion of at least one optical sensor.

According to an embodiment, the apparatus may be configured to project a second filtered light signal from the wide bandwidth source to at least a second portion of at least one optical sensor.

According to an embodiment, the electromagnetic wave dispersive filter may be configured to project a spatially dispersed light signal from the wide bandwidth source to at least a third portion of at least one optical sensor.

According to an embodiment, wherein each of the at least one optical sensor comprising substantially similar Red Green Blue (RGB) measurement characteristics.

According to an embodiment, a first narrow bandwidth electromagnetic wave filter may comprise a first narrow bandwidth optical filter.

According to an embodiment, a second narrow bandwidth electromagnetic wave filter may comprise a second narrow bandwidth optical filter.

According to an embodiment, an electromagnetic wave dispersive filter may comprise a transparent optical dispersive filter.

According to an embodiment, an electromagnetic wave dispersive filter may comprise a reflective optical dispersive filter.

According to an embodiment, an electromagnetic wave dispersive filter may comprise an optical filter.

According to an embodiment, an electromagnetic wave dispersive filter may comprise a prism.

According to an embodiment, an electromagnetic wave dispersive filter may comprise a diffraction grating.

According to an embodiment, an electromagnetic wave dispersive filter may comprise a transmission diffraction grating.

According to an embodiment, an electromagnetic wave dispersive filter may comprise a reflective diffraction grating.

According to an embodiment, a medium may comprise: a first narrow bandwidth electromagnetic wave filter, a second narrow bandwidth electromagnetic wave filter, and an electromagnetic wave dispersive filter.

According to an embodiment, a medium may comprise an optical medium.

According to an embodiment, a medium may comprise a reflective optical medium.

According to an embodiment, a medium may comprise a transmission optical medium.

According to an embodiment, the first narrow bandwidth electromagnetic wave filter, the second narrow bandwidth electromagnetic wave filter and the electromagnetic wave dispersive filter may be substantially planar to each other.

According to an embodiment, a first narrow bandwidth optical wave filter and a second narrow bandwidth optical wave filter may comprise a reflective filter.

According to an embodiment, a first narrow bandwidth optical wave filter and a second narrow bandwidth optical wave filter may comprise a transmissive filter.

According to an embodiment, an image processor may comprise: one or more processors; and one or more memories containing stored instructions that, when executed by the one or more processors, may cause the image processor to process a pixel of a raw image using calibration coefficients.

According to an embodiment, a computer readable medium may be comprised of stored instructions that, when executed by the one or more processors, may cause a computing device to process a pixel of a raw image using one or more calibration coefficients.

According to an embodiment, an apparatus may project narrow bandwidth signals and dispersed optical signals onto different regions of an optical sensor.

According to an embodiment, at least two monochromatic lights may be comprised of different known monochromatic wavelengths.

According to an embodiment, a spatially spectrally dispersed light may be comprised of a known spectral amplitude distribution.

According to an embodiment, an apparatus may determine calibration parameters based on: a first color component measurements of the at least two monochromatic lights on the optical sensor; a second color component measurements of the spatially spectrally dispersed light on the optical sensor.

According to an embodiment, a metric for distances between the first color component measurements and the second color component measurements may utilize different locations of the second color component measurements of the spatially spectrally dispersed light to each different known monochromatic wavelength.

According to an embodiment, an apparatus may determine power relations at known wavelengths between a known power curve of the spectrally dispersed light; and powers of a second color component as determined by measurements.

According to an embodiment, the first color component measurements and the second color component measurements may be comprised of Red Green Blue (RGB) measurements.

According to an embodiment, the first color component measurements and the second color component measurements may be comprised of mosaiced measurements such as red, green1, green2, and blue.

According to an embodiment the first color component measurements and the second color component measurements may comprise Cyan, Magenta, and Yellow (CMY) measurements.

According to an embodiment, the known power curve may be based on at least two of the following: geographic location; atmospheric conditions; time of a year; time of a day; and irradiance of a sun.

According to an embodiment, the apparatus may comprise attenuating at least one of the spectrally dispersed light and the at least two monochromatic lights, wherein the attenuating may be effected by at least one of: a neutral density filter; fixed cross-polarized lenses; variable cross-polarized lenses; or an amplitude decreasing optical filter of known spectral response.

According to an embodiment, the apparatus may utilize an image captured on the optical sensor.

According to an embodiment, the apparatus may use the calibration parameters to compress an image captured on the optical sensor.

According to an embodiment, the apparatus may comprise applying calibration parameters to an image captured on the optical sensor.

According to an embodiment, the spectrally dispersed light may originate from a celestial object; a sun; a red, and/or blue and/or green light source; a tristimulus colored light source; an artificial light; a LED light; a fluorescent light; or incandescent light.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The terms "including" and "comprising" should be interpreted as meaning "including, but not limited to." In this disclosure, the abbreviation "e.g." means "for example" and is followed by one or more examples that illustrate a term receding the abbreviation.

In this disclosure and the claims, differentiating terms like "first," "second," "third," identify separate elements without implying an ordering of the elements or functionality of the elements. Differentiating terms may be replaced with other differentiating terms when describing an embodiment.

In this disclosure, various embodiments are disclosed. Limitations, features, and/or elements from the disclosed example embodiments may be combined to create further embodiments within the scope of the disclosure.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In particular, it should be noted that, for example purposes, the above explanation has focused on calibrating a camera. However, one skilled in the art will recognize that embodiments of the invention may also be implemented to calibrate other multispectral sensors such as, for example, a dual band FLIR sensor, a hyperspectral sensor, combinations thereof, a multispectral and/or the like. In this context, a sensor is considered to be an imaging sensor comprised of multiple pixels.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

In addition, it should be understood that the figures and algorithms, which highlight the functionality and advantages of the present invention, are presented for example purposes only. The architecture of the present invention is sufficiently flexible and configurable, such that it may be utilized in ways other than that shown in the accompanying figures and algorithms. For example, the steps listed in any flowchart may be re-ordered or only optionally used in an embodiment.

In this specification, "a" and "an" and similar phrases are to be interpreted as "at least one" and "one or more." References to "the," "said," and similar phrases should be interpreted as "the at least one", "said at least one", etc. References to "an" embodiment in this disclosure are not necessarily to the same embodiment.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A system comprising:
a first monochromatic source configured to produce a first monochromatic signal wherein: the first monochromatic signal within a bandwidth of a multispectral imaging system; and, the first monochromatic signal comprising a first known wavelength;
a second monochromatic source configured to produce a second monochromatic signal
wherein: the second monochromatic signal within the bandwidth of the multispectral imaging system; and, the second monochromatic signal comprising a second known wavelength;
an optical dispersive filter configured to convert a wide bandwidth signal to a spatially
distributed wide bandwidth dispersed spectrum;
a device comprising: one or more processors; and, memory containing stored instructions that, when executed by the one or more processors, causes the device to:
receive: a first multispectral measurement of the first monochromatic signal taken at a first pixel location; a second multispectral measurement of the second monochromatic signal taken at a second pixel location; and, a multiplicity of third multispectral measurements of the spatially distributed wide bandwidth dispersed spectrum taken at a multiplicity of third pixel locations;
relate: the first multispectral measurement to the first known wavelength; and, the second multispectral measurement to the second known wavelength; a first third pixel location of the multiplicity of third pixel locations meeting a closeness metric between a third multispectral measurement and _ the first multispectral measurement to the first known wavelength; and,
a second third pixel location of the multiplicity of third pixel locations meeting a closeness metric between a fourth multispectral measurement and the second multispectral measurement to the second known wavelength; and, output multispectral imaging system calibration values, comprising:
a relation of the first third pixel location to the first known wavelength; and,
a relation of the second third pixel location to the second known wavelength.

2. The system according to claim 1, wherein the multispectral measurements comprise amplitude values of wavelengths of light as limited to the bandwidths of at least three imaging sensor narrow bandwidth filters with different center wavelengths.

3. The system according to claim 1, wherein the multispectral measurements are acquired from mosaiced pixels.

4. The system according to claim 1, wherein the output spectrum calibration values comprise at least red, green, and blue calibration values.

5. The system according to claim 1, wherein the stored instructions, when executed by the one or more processors, further causes the device to interpolate, based on the first third pixel location and the second third pixel location, a relation of a third third pixel location to an interpolated wavelength.

6. The system according to claim 5, wherein the stored instructions, when executed by the one or more processors, further cause the device to receive:
a first know power of the interpolated wavelength of the third third pixel location; and,
a first measured power of the third third pixel location.

7. The system according to claim 6, wherein the stored instructions, when executed by the one or more processors, further cause the device to determine a calibration coefficient based on:
the first know power;
the first measured power; and,
a power calibration function of the first known power and the first measured power.

8. The system according to claim 7, wherein the power calibration function comprises at least one of the following:
a non-linear relation;
a piecewise linear relation;
a linear relation; and,
a table of paired values.

9. A device comprising: one or more processors; and, memory containing stored instructions that, when executed by the one or more processors, cause the device to: receive at least: a first multispectral measurement of a first monochromatic signal taken at a first pixel location, wherein the first monochromatic signal is: within a bandwidth of a multispectral imaging system; and, comprises a first known wavelength; a second multispectral measurement of a second monochromatic signal taken at a second pixel location, wherein the second monochromatic signal is: within the bandwidth of the multispectral imaging system; and, comprises a second known wavelength; a multiplicity of third multispectral measurements of a spatially distributed wide bandwidth dispersed spectrum, of a wide bandwidth signal, taken at a multiplicity of third pixel locations; relate: the first multispectral measurement to the first known wavelength; and, the second multispectral measurement to the second known wavelength; a first third pixel location of the multiplicity of third pixel locations meeting a closeness metric between a third multispectral measurement and the first multispectral measurement; and, a second third pixel location of the multiplicity of third pixel locations meeting a closeness metric between a fourth multispectral measurement and the second multispectral measurement; and, output spectrum calibration values, for the multispectral imaging system, comprising at least:
  a relation of the first third pixel location to the first known wavelength; and,
  a relation of the second third pixel location to the second known wavelength.

10. The system according to claim 9, wherein the multispectral measurements comprise amplitude values of wavelengths of light as limited to the bandwidths of at least three imaging sensor narrow bandwidth filters with different center wavelengths.

11. The system according to claim 9, wherein the multispectral measurements comprises mosaiced pixels.

12. The device of claim 9, further comprising a first monochromatic source configured to produce the first monochromatic signal.

13. The device of claim 9, further comprising a second monochromatic source configured to produce the second monochromatic signal.

14. The device of claim 9, further comprising an optical dispersive filter configured to convert the wide bandwidth signal to the spatially distributed wide bandwidth dispersed spectrum.

15. A method comprising:
  receiving, from a multi-pixel imaging sensor:
    a first multispectral measurement of a first monochromatic signal taken at a first pixel location, wherein the first monochromatic signal is:
      within a bandwidth of a multispectral imaging system; and,
      comprises a first known wavelength;
    a second multispectral measurement of a second monochromatic signal taken at a second pixel location, wherein the second monochromatic signal is:
      within the bandwidth of the multispectral imaging system; and, comprises a second known wavelength;
    a multiplicity of third multispectral measurements of a spatially distributed wide bandwidth dispersed spectrum taken at a multiplicity of third pixel locations;
  relating:
    the first multispectral measurement to the first known wavelength; and,
    the second multispectral measurement to the second known wavelength;
    a first third pixel location of the multiplicity of third pixel locations meeting a closeness metric between a first third multispectral measurements and the first multispectral measurement; and,
    a second third pixel location of the multiplicity of third pixel locations meeting a closeness metric between a second multispectral measurement and the second multispectral measurement; and,
  outputting, to a storage medium, spectrum calibration values, for the multispectral imaging system, comprising:
    a relation of the first third pixel location to the first known wavelength; and,
    a relation of the second third pixel location to the second known wavelength.

16. The method according to claim 15, wherein a multispectral imaging system is at least one of the following:
  a color camera;
  a thermal imager; and,
  a video imager.

17. The method according to claim 15, wherein a multispectral imaging system is a hyperspectral imager.

18. The method according to claim 15, wherein the closeness metric between the one of the third multispectral measurements and the first multispectral measurement comprises at least one of:
  an L2 norm measure between a unit vector representation of pixel values;
  an L2 norm measure between a unit cube representation of pixel values;
  a city block distance measure between the unit vector representation of pixel values; and,
  a projection of a first vector onto a second vector such that the projection produces a maximum value.

19. The method according to claim 15, further comprising receiving:
  a first know power of the interpolated wavelength of a third third pixel location; and,
  a first measured power of the third third pixel location.

20. The system according to claim 15, further comprising generating a power calibration coefficient based on:
  the first know power;
  the first measured power; and,
  a power calibration function of: the first know power and the first measured power.

* * * * *